(12) United States Patent
Eun

(10) Patent No.: US 10,521,621 B2
(45) Date of Patent: Dec. 31, 2019

(54) POS DEVICE

(71) Applicant: POSBANK CO., LTD, Seoul (KR)

(72) Inventor: Dong Uk Eun, Gwangmyeong (KR)

(73) Assignee: POSBANK CO., LTD, Seoul (KR)

( * ) Notice: Subject to any disclaimer, the term of this patent is extended or adjusted under 35 U.S.C. 154(b) by 0 days.

(21) Appl. No.: 16/086,992

(22) PCT Filed: Nov. 9, 2017

(86) PCT No.: PCT/KR2017/012694
§ 371 (c)(1),
(2) Date: Sep. 20, 2018

(87) PCT Pub. No.: WO2018/101641
PCT Pub. Date: Jun. 7, 2018

(65) Prior Publication Data
US 2019/0278954 A1    Sep. 12, 2019

(30) Foreign Application Priority Data

Nov. 30, 2016   (KR) ........................ 10-2016-0160988

(51) Int. Cl.
*G06K 7/00* (2006.01)
*G07G 1/00* (2006.01)
*G06F 1/16* (2006.01)
*G06F 1/18* (2006.01)
*G06Q 20/20* (2012.01)
*G07G 1/12* (2006.01)

(52) U.S. Cl.
CPC ............. *G06K 7/0069* (2013.01); *G06F 1/16* (2013.01); *G07G 1/0018* (2013.01); *G06F 1/183* (2013.01); *G06F 2200/1612* (2013.01); *G06F 2200/1631* (2013.01); *G06Q 20/20* (2013.01); *G07G 1/12* (2013.01)

(58) Field of Classification Search
CPC .......... G07G 1/0018; G07G 1/12; G06F 1/16; G06F 2200/1631; G06F 1/1601; G06F 1/183; G06F 2200/1612; G06Q 20/20; G06Q 20/208
See application file for complete search history.

(56) References Cited

U.S. PATENT DOCUMENTS 4,552,418 A * 11/1985 Sarnezki .............. F16M 11/048
                                                    312/242
5,478,998 A * 12/1995 Charych ............ G06K 7/10861
                                                    235/462.43
(Continued)

FOREIGN PATENT DOCUMENTS

CN          101060761 A    10/2007
JP         2000207638 A     7/2000
(Continued)

*Primary Examiner* — Christopher Stanford
(74) *Attorney, Agent, or Firm* — Patentfile, LLC; Bradley C. Fach; Steven R. Kick

(57) ABSTRACT

The present invention relates to a POS device, the POS device (1) having improved characteristics, largely comprising: a saving device attachment/detachment structure (100); a card reader bidirectional mounting structure (200); a display frame (300) integrally formed with an input/output port mounting portion; and a hinge-coupling structure (400).

5 Claims, 21 Drawing Sheets

(56) References Cited

U.S. PATENT DOCUMENTS

| | | | | |
|---|---|---|---|---|
| 5,710,416 A * | 1/1998 | Belknap | G06K 7/10861 | 235/380 |
| 5,973,922 A * | 10/1999 | Kamphuis | G06F 1/16 | 165/104.33 |
| 5,978,225 A * | 11/1999 | Kamphuis | G06F 1/20 | 165/80.2 |
| 6,003,008 A * | 12/1999 | Postrel | G06F 1/183 | 235/381 |
| 6,053,410 A * | 4/2000 | Wike, Jr. | G06F 1/16 | 235/462.43 |
| 6,053,411 A * | 4/2000 | Nugent, Jr. | G07G 1/0018 | 235/462.43 |
| 6,053,412 A * | 4/2000 | Wike, Jr. | G06F 1/16 | 235/375 |
| 6,062,477 A * | 5/2000 | Wike, Jr. | G06F 1/16 | 235/383 |
| 6,062,478 A * | 5/2000 | Izaguirre | G06F 1/16 | 235/462.43 |
| 6,065,677 A * | 5/2000 | Lippert | G07G 1/0018 | 235/462.43 |
| 6,085,972 A * | 7/2000 | Wright | F16M 11/10 | 235/375 |
| 6,363,355 B1 * | 3/2002 | Morrison | A47F 9/047 | 186/59 |
| 7,191,948 B1 * | 3/2007 | Baitz | A63F 3/064 | 235/435 |
| 7,451,917 B2 * | 11/2008 | McCall | G06Q 20/00 | 235/379 |
| 7,478,789 B2 | 1/2009 | Yukawa et al. | | |
| 7,837,104 B2 * | 11/2010 | Lum | F16M 11/10 | 235/379 |
| 8,191,786 B2 * | 6/2012 | Huang | G06K 7/10881 | 235/375 |
| 9,033,228 B2 * | 5/2015 | Govindarajan | G06Q 90/00 | 235/383 |
| 9,261,904 B2 * | 2/2016 | Liu | G06F 1/1613 | |
| 10,121,136 B2 * | 11/2018 | Mocko | G06Q 20/20 | |

FOREIGN PATENT DOCUMENTS

| | | |
|---|---|---|
| KR | 1020040043597 | 5/2004 |
| KR | 1020070101140 | 10/2007 |
| KR | 2020090008549 | 8/2009 |
| KR | 200478170 | 9/2015 |
| TW | 201104307 A | 2/2011 |
| TW | 201131335 A | 9/2011 |

* cited by examiner

POS DEVICE

This Application is a 35 U.S.C. 371 National Stage Entry of International Application No. PCT/KR2017/012694 filed on Nov. 9, 2017, which claims the benefit of Republic of Korea Patent Application No. 10-2016-0160988, filed on Nov. 30, 2016, the entire disclosures of which are incorporated by reference herein.

TECHNICAL FIELD

The present invention relates to a POS device. In particular, the present invention relates to a POS device 1 provided with a cover 20 coupled to an upper side of a rear surface case 10 in an attachable/detachable manner, which includes:

a saving device attachment/detachment structure 100 including: a saving unit mounting unit 110 formed at a portion of the rear surface case 10 and disposed at an upper side of a main substrate connector 40 mounted to a main substrate 30; a saving unit tray 120 inserted into the saving unit mounting unit 110 and coupled in an attachable/detachable manner; and a saving unit 130 including a saving unit connector 132 coupled to the saving unit tray 120 while being accommodated therein and connected to the main substrate connector 40 when the saving unit tray 120 is inserted and mounted to the saving unit mounting unit 110;

a card reader bidirectional mounting structure 200 including: a mounting bracket 210 installed on at least one of a left side and a right side of a POS device main body 10; a card reader front cover 220 including a front cover slot 221, through which a card passes, formed at a front surface thereof and coupled to the mounting bracket 210 in an attachable/detachable manner; a card reader rear cover 240 coupled to the card reader front cover 220 in a detachable manner; and a card reading assembly 230 installed in the card reader front cover 220 and the card reader rear cover 240 to read information recorded in the card;

an input/output port mounting unit integrated type display frame 300 of the POS device, which includes: a display panel mounting unit 310, in which a display panel 50 is loaded, formed at a front surface thereof; an input/output port mounting unit 320 formed at a rear surface thereof and having an input/output port mounting hole 322, in which an input/output port 31 provided at a main substrate 30 is inserted and coupled, the input/output port mounting unit having a part cut from an input/output port mounting unit perforation 321 and being formed to be bent towards a rear direction so as to be protruded therefrom; and a lower main ventilation hole 330 formed at a lower side of the rear surface thereof; and a hinge coupling structure 400 of the POS device, which includes: a hinge bracket 410 mounted inside the rear surface case 10 and including a hinge shaft installation part 412 formed with a hinge shaft coupling hole 413 and bent backward from each of both side surface thereof; a hinge shaft 420 including: a flat part 421 inserted and coupled to the hinge shaft coupling hole 413 in a direction from the inside to the outside and formed with a stand coupling screw hole 422 having a diameter greater than that of the hinge shaft coupling hole 413 and coupled to a stand S while both side surfaces thereof are processed to be flat; and a flat screw part 423 passing through the hinge shaft coupling hole 413 to protrude to the outside and formed with a screw thread while both side surfaces thereof are processed to be flat; a disk spring 442 inserted and installed to the flat screw part 423 with the hinge shaft installation part 412 therebetween; and a coupling nut 440 coupled to the flat screw part 413.

BACKGROUND ART

A point of sale (POS) system, which represents a point of sale management system, installs a POS terminal at a store to manage overall distribution economy such as market research, stocktaking, point of sale management as well as business transaction of sales.

That is, the POS system automatically collects and records sales management data (which will be used for sales management and stocktaking of products), which is accompanied with product sales, by providing a POS terminal functioning as an electronic cash register and a computer at a counter for selling products of department stores or supermarkets.

While a typical cash register has a main role of rapidly and exactly calculating sales amount of a customer at a site, the current POS system collects and processes information regarding the purchase and sales of products and, on the basis of this, rapidly checks and manages all sorts of product information and accounting information.

The POS terminal has the same function as the typical cash register, a function of temporarily recording data, and a function of transmitting point of sale data to a high-ranked device while connected the same. A product code is entered through a scanner or key input and then transmitted to the high-ranked device.

Regarding the POS terminal for performing the above-described functions, related arts including below patent document 1 are disclosed. The POS terminal includes a saving unit for storing an operation program and all sorts of data.

A hard disk drive (HDD) has been widely used as a typical saving unit for the POS terminal, and, in recent years, a SSD memory has also been widely used.

The saving unit may be frequently replaced according to various reasons such as operational errors or operation program update. However, since the POS terminal is necessary to be continuously used during business hours, a limitation of unavailability of the POS terminal during a time required for replacing the saving unit may cause a great limitation in which all payment works may not be processed during the time at most of small-sized stores, which use only one POS terminal.

Also, the above-described POS terminal includes a card reader for reading various card information of a credit card or a debit card, which is widely used for payment purposes, and the card reader is typically fixed to at one side of the POS device.

However, in case of a left-handed person of users using the POS device, the ratio of the left-handed persons is especially great in Europe or North America, and the left-handed persons may feel inconvenience when the card reader is fixed to the above-described position.

The above-described typical POS terminal is generally configured such that a main substrate and a display panel for displaying an operation screen are separately mounted to a case such as a main body as disclosed the "POS terminal device" in the below patent document 2 (Korean Patent Publication NO. 10-2016-0052869).

However, the above typical invention has a limitation in manufacturing efficiency and manufacturing costs because a frame for fixing the display panel and a frame for fixing the main substrate are required to be separately manufactured, and furthermore, a process of coupling the display panel and the main substrate is required in an assembly process.

Also, since the POS terminal is turned on and continuously operated during the business hours due to operational characteristics of the POS terminal, a structure of efficiently discharging the heat generated from the display panel and the main substrate is required.

Also, the POS terminal is generally installed on a predetermined stand so as to adjust an installation angle of a display or a touch panel, and a hinge structure for the above-described POS terminal is disclosed in various related inventions including "monitor mounting tool and POS device including the same" of the below patent document 3 (Korean Registered Utility Model NO. 20-0476965).

However, the typical inventions has a limitation in that a display panel, which has gradually increased in size and weight in recent years, may not be effectively supported, and an angle thereof may not be easily adjusted.

DISCLOSURE OF THE INVENTION

Technical Problem

The present invention provides a saving device attachment/detachment structure of a POS device, which is an efficient structure capable of detaching and mounting a saving unit such as a hard disk drive within several seconds to remarkably reduce a non-operation time.

The present invention also provides a card reader bidirectional mounting structure of the POS device, which is capable of maximizing usage convenience by freely changing installation directions to install a card reader of the POS device on at least one of a left side and a right side when a user demands.

The present invention also provides an input/output port mounting unit integrated display frame of the POS device, which is manufactured by perforating and bending one frame to sustain a mechanical load, thereby having an extremely efficient single structure in which a display panel and an input/output port of a main substrate are mounted to each other in a mechanically firm manner and also improving efficiency in manufacturing costs and manufacturing process.

The present invention also enables an air current caused by heat generated from a display panel and a main substrate to be generated and then efficiently circulated, thereby efficiently discharging the heat even during long time operation.

The present invention also enables firm mounting to a rear surface frame of the POS device through a hinge bracket, and stable fixing and easy angle adjustment during moving through appropriate friction force.

Technical Solution

An embodiment of the present invention provides a POS device provided with a cover 20 coupled to an upper side of a rear surface case 10 in an attachable/detachable manner, the POS device including:

a saving device attachment/detachment structure 100 including: a saving unit mounting unit 110 formed at a portion of the rear surface case 10 and disposed at an upper side of a main substrate connector 40 mounted to a main substrate 30; a saving unit tray 120 inserted into the saving unit mounting unit 110 and coupled in an attachable/detachable manner; and a saving unit 130 including a saving unit connector 132 coupled to the saving unit tray 120 while being accommodated therein and connected to the main substrate connector 40 when the saving unit tray 120 is inserted and mounted to the saving unit mounting unit 110;

a card reader bidirectional mounting structure 200 including: a mounting bracket 210 installed on at least one of a left side and a right side of a POS device main body 10; a card reader front cover 220 including a front cover slot 221, through which a card passes, formed at a front surface thereof and coupled to the mounting bracket 210 in an attachable/detachable manner; a card reader rear cover 240 coupled to the card reader front cover 220 in a detachable manner; and a card reading assembly 230 installed in the card reader front cover 220 and the card reader rear cover 240 to read information recorded in the card;

an input/output port mounting unit integrated type display frame 300 of the POS device, which includes: a display panel mounting unit 310, in which a display panel 50 is loaded, formed at a front surface thereof; an input/output port mounting unit 320 formed at a rear surface thereof and having an input/output port mounting hole 322, to which an input/output port 31 provided at a main substrate 30 is inserted and coupled, the input/output port mounting unit having a part cut from an input/output port mounting unit perforation 321 and being formed to be bent towards a rear direction so as to be protruded therefrom; and a lower main ventilation hole 330 formed at a lower side of the rear surface thereof; and a hinge coupling structure 400 of the POS device, which includes: a hinge bracket 410 mounted inside the rear surface case 10 and including a hinge shaft installation part 412 formed with a hinge shaft coupling hole 413 and bent backward from each of both side surface thereof; a hinge shaft 420 including: a flat part 421 inserted and coupled to the hinge shaft coupling hole 413 in a direction from the inside to the outside and formed with a stand coupling screw hole 422 having a diameter greater than that of the hinge shaft coupling hole 413 and coupled to a stand S while both side surfaces thereof are processed to be flat; and a flat screw part 423 passing through the hinge shaft coupling hole 413 to protrude to the outside and formed with a screw thread while both side surfaces thereof are processed to be flat; a disk spring 44 inserted and installed to the flat screw part 423 with the hinge shaft installation part 412 therebetween; and a coupling nut 440 coupled to the flat screw part 413.

In an embodiment, the saving unit mounting unit 110 may further include: a mounting guide wall 111 configured to support and guide the saving unit tray 120 while contacting both side surfaces thereof; and a stopper coupling groove 112 formed at an upper side of each of both side surfaces of the mounting guide wall 111, and the saving unit tray 120 may further include a mounting curved elastic part 126 disposed on an upper side of each of both side surfaces of the saving unit tray 120 and formed with a mounting stopper 127 inserted into the stopper coupling groove 112 in an elastic manner when the saving unit tray 120 is inserted and mounted to the saving unit mounting unit 110.

Here, the saving unit tray 120 may further include: a saving unit coupling part 121 formed to be accommodated in the saving unit 130; and a saving unit connector opening 125 formed at a bottom surface so as to expose the saving unit connector 132 of the saving unit 130, and the saving unit 130 may further include a coupling groove 131 formed at one portion or more of both side surfaces of the saving unit 130.

Here, the saving unit tray 120 may further include an elastic coupling mounting part 122 configured to provide elasticity to a saving unit coupling projection 124 inserted into the coupling groove 131 by a cut groove.

In an embodiment, the POS device may further include: a front cover attachment/detachment fixing part 211 formed at two portions or more of a front surface of the mounting bracket 210 and including a side wall part 212 and a stopper 213 to form a "L" shape; a fixing part through-hole 222 formed at the card reader front cover 220 so that the front cover attachment/detachment fixing part 211 passes therethrough; a coupling side wall part 223 formed consecutively to the fixing part through-hole 222 and inserted and coupled to the side wall part 212 and the stopper 213;

a rear cover coupling projection 226 formed at each of an upper side and a lower side of an inward side of the inside of the card reader front cover 220; a coupling groove 227 formed at each of two portions or more of an outward direction of the inside of the card reader front cover 220; a first coupling projection 242 formed at each of an upper side and a lower side of an inward direction of the inside of the card reader rear cover 240 so as to be coupled to the rear cover coupling projection 226 in an attachable/detachable manner; and a second coupling projection 243 formed at each of an upper side and a lower side of an outer direction of the inside of the card reader rear cover so as to be inserted and coupled to the coupling groove 227 in an attachable/detachable manner.

In an embodiment, the input/output port mounting unit integrated type display frame 300 may further include: a main substrate mounting unit 360, which further includes a recessed kernel 350 recessed inward between the input/output port mounting unit perforation 321 and the lower main ventilation hole 330 and to which the main substrate 30 is mounted and fixed; an upper first ventilation hole 340 formed at an upper side of the input/output port mounting unit perforation 321; a plurality of upper second ventilation holes 341 formed at the upper side of the input/output port mounting unit perforation 321; and a plurality of lower auxiliary ventilation holes 331 formed at a lower side of the lower main ventilation hole 330.

Also, the hinge coupling structure 400 may further include: a hinge bracket coupling through-hole 411 formed at the hinge bracket 410 so that a coupling unit is coupled to the hinge bracket mounting through-hole 12 formed at the rear surface case 10 while passing therethrough; a protruding stopper 414 formed to protrude inward the hinge shaft 420 installation part 412; and a hinge stopper 430 formed with a flat screw coupling hole 431 coupled to the flat screw part 423 and including a stopper arm 432 formed to restrict rotation of the hinge shaft 420 while contacting the protruding stopper 414.

Advantageous Effects

According to the present invention, since the saving unit such as the hard disk drive may be detached or mounted through the efficient structure, the saving device attachment/detachment structure of the POS device, which may remarkably reduce the service unavailable time, may be provided.

Also, since the card reader of the POS device may be easily and freely changed and installed on one of the left and right sides according to necessity of the user, the usage convenience may be maximized.

Also, the present invention provides the input/output port mounting unit integrated display frame of the POS device, which is manufactured by perforating and bending one frame to sustain a mechanical load, thereby having the extremely efficient single structure in which the display panel and the input/output port of the main substrate are mounted to each other in a mechanically firm manner and also improving efficiency in manufacturing costs and manufacturing process.

Also, the present invention enables an air current caused by heat generated from a display panel and a main substrate to be generated and then efficiently circulated, thereby efficiently discharging the heat even during long time operation.

Also, the firm mounting to the rear surface frame of the POS device may be performed through the hinge bracket, and stable fixing and easy angle adjustment may be performed through the appropriate friction force at the same time.

MODE FOR CARRYING OUT THE INVENTION

Figure 1:
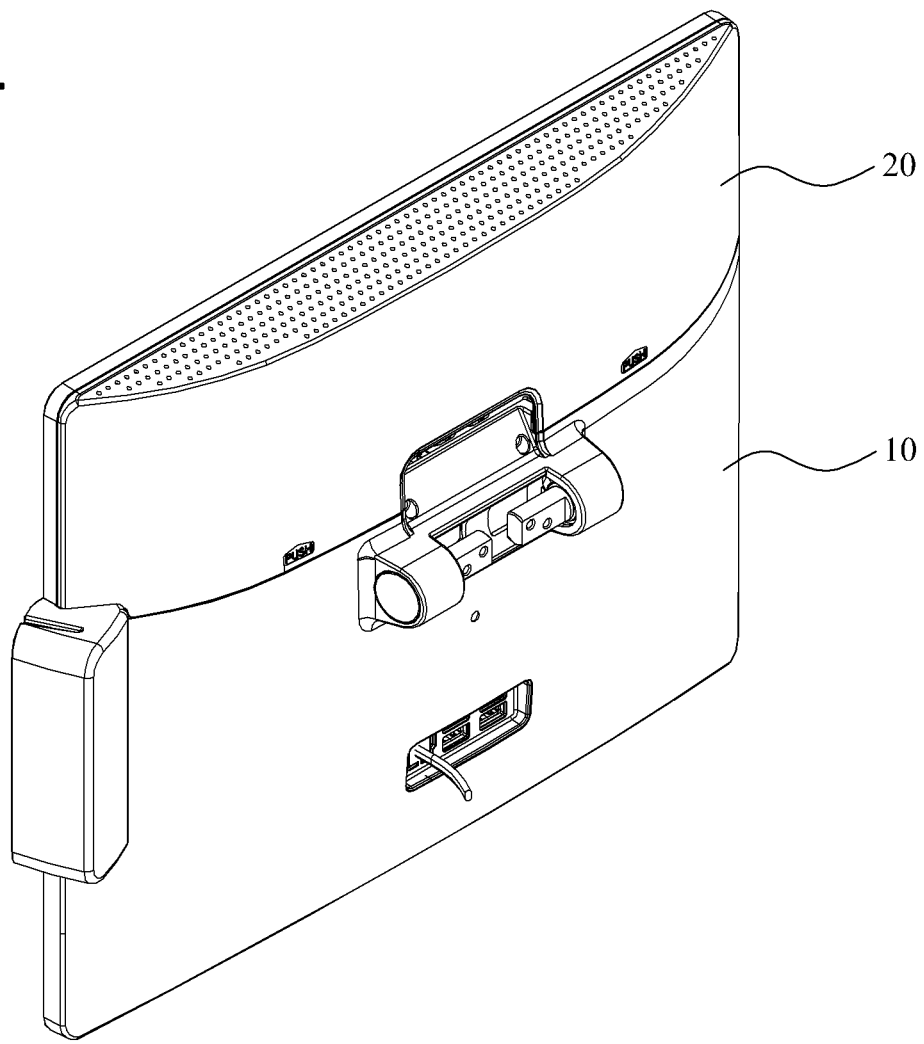
FIG. 1 is a view illustrating a rear structure of a saving device attachment/detachment structure of a POS device according to an embodiment of the present invention.

Hereinafter, a POS device according to an embodiment of the present invention will be described in detail with reference to the accompanying drawings. It is also noted that like reference numerals denote like elements in appreciating the drawings. Moreover, detailed descriptions related to well-known functions or configurations will be ruled out in order not to unnecessarily obscure subject matters of the present invention.

The POS device according to an embodiment of the present invention has improved characteristics by largely including: a saving device attachment/detachment structure 100; a card reader bidirectional mounting structure 200; a display frame 300 integrally formed with an input/output port mounting portion; and a hinge-coupling structure 400.

Firstly, the saving device attachment/detachment structure 100 will be described. As illustrated in FIG. 1, the saving device attachment/detachment structure 100 according to an embodiment of the present invention is used for a POS device including a cover 20 coupled to an upper side of a rear surface case 10 in an attachable/detachable manner, and largely includes a saving unit mounting unit 110, a saving unit tray 120, and a saving unit 130.

Figure 2:
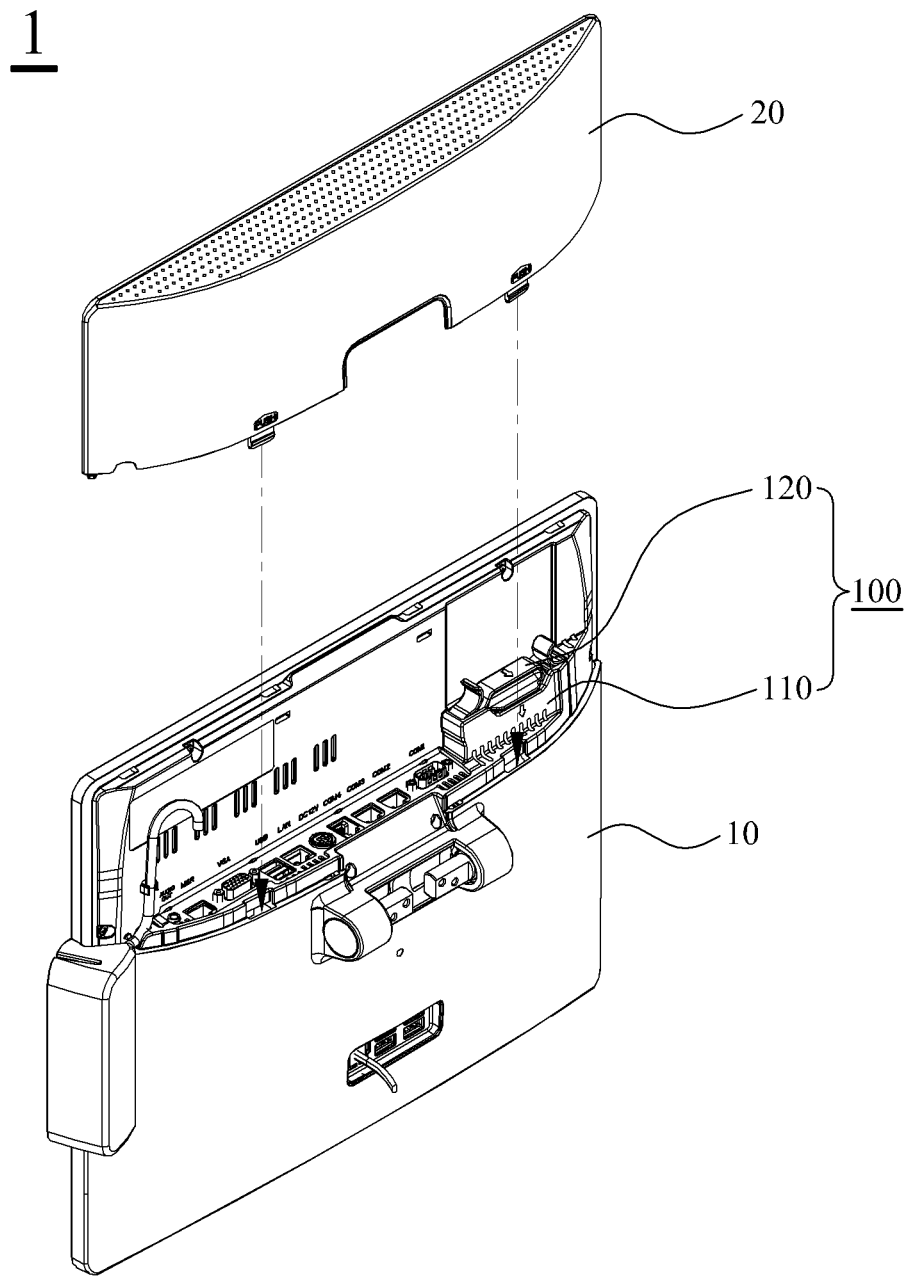
FIG. 2 is a view illustrating a state, in which a saving unit tray is coupled while a cover is separated, of the saving device attachment/detachment structure of the POS device according to an embodiment of the present invention.
Figure 3:
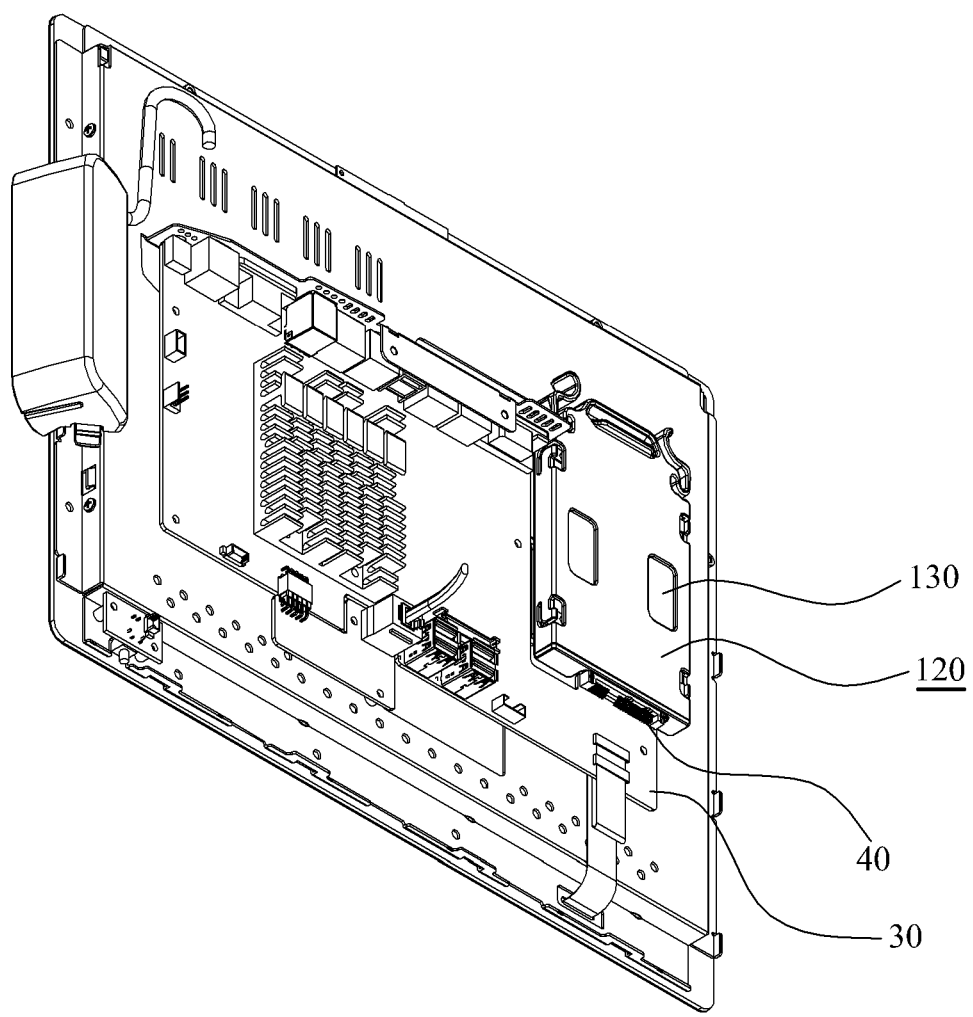
FIG. 3 is a view illustrating a state, in which the saving unit tray is coupled to a main substrate connector of a main substrate, of the saving device attachment/detachment structure of the POS device according to an embodiment of the present invention.
Figure 6:
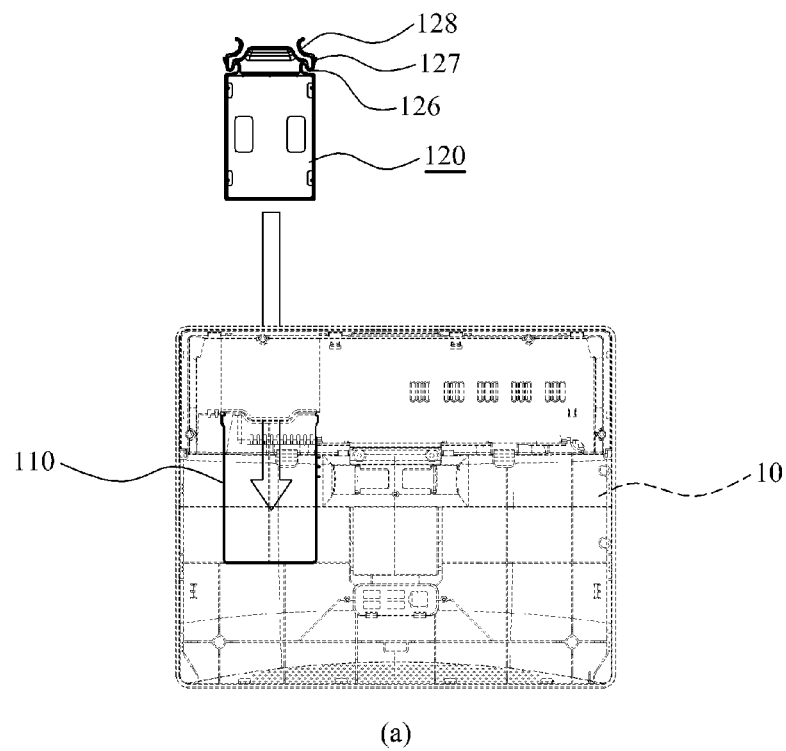
FIG. 6 is a view illustrating a structure, in which the saving unit tray is coupled to a saving unit mounting unit, of the saving device attachment/detachment structure of the POS device mounting unit according to an embodiment of the present invention.
Figure 6:
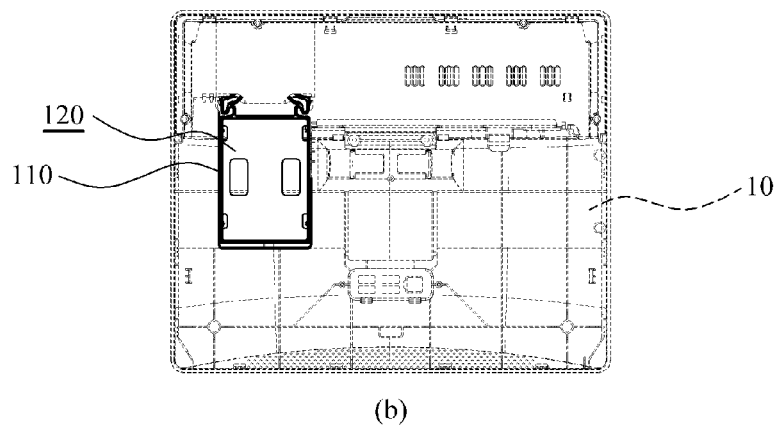
Figure 7:
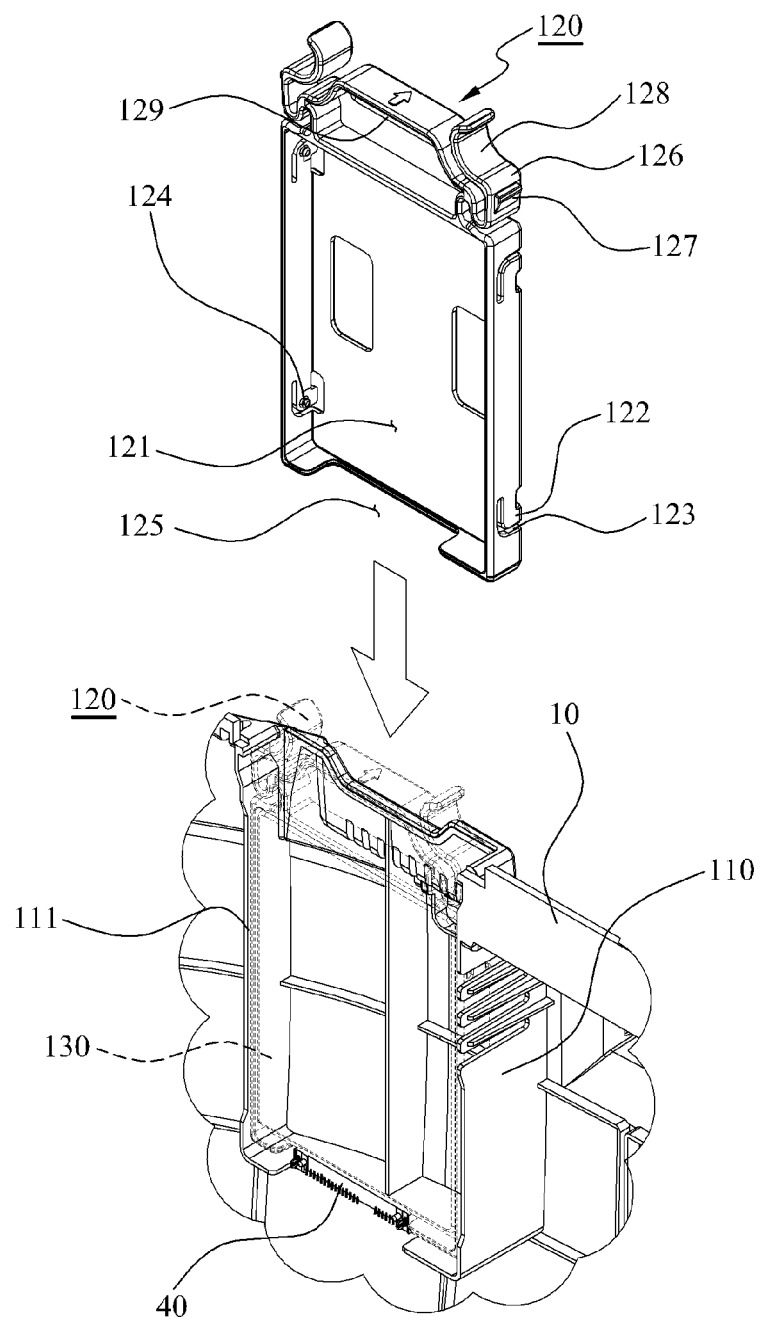
FIG. 7 is a perspective view illustrating a structure, in which the saving unit tray is coupled to the saving unit mounting unit, of the saving device attachment/detachment structure of the POS device according to an embodiment of the present invention.

Firstly, the saving unit mounting unit 110 will be described. As illustrated in FIGS. 2 and 7, the saving unit mounting unit 110 is separately formed at a portion of the rear surface case 10 or integrally formed with the rear surface case 10. The saving unit mounting unit 110 is formed at an upper side of a main substrate connector 40 mounted to a main substrate 30 as illustrated in FIGS. 3 and 7. Also, the saving unit mounting unit 110 has a function allowing the saving unit tray 120 to be inserted and coupling-fixed thereto as illustrated in FIGS. 6 and 7.

The above-described saving unit mounting unit 110 may be embodied in various forms. In an embodiment, as illustrated in FIG. 7, the saving unit mounting unit 110 may further include: a mounting guide wall supporting and guiding the saving unit tray 120 while contacting both side surfaces of the saving unit tray 120; and a stopper coupling groove 112 formed at an upper side of each of both side surface of the mounting guide wall 111.

Next, the saving unit tray 120 will be described. As illustrated in FIGS. 2, 6, and 7, the saving unit tray 120 is inserted and coupled to the saving unit mounting unit 110 in an attachable/detachable manner.

Figure 4:
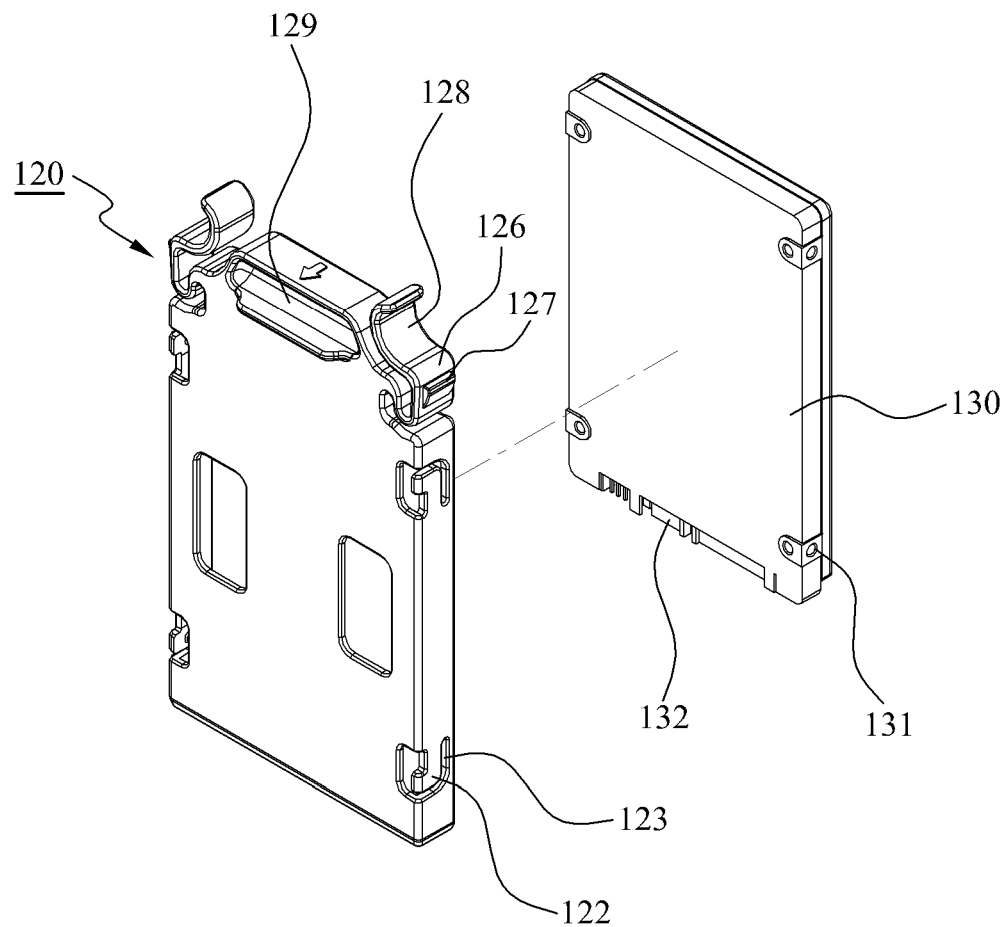
FIG. 4 is a rear perspective view illustrating a structure, in which the saving unit tray is coupled to a saving unit, of the saving device attachment/detachment structure of the POS device according to an embodiment of the present invention.
Figure 5:
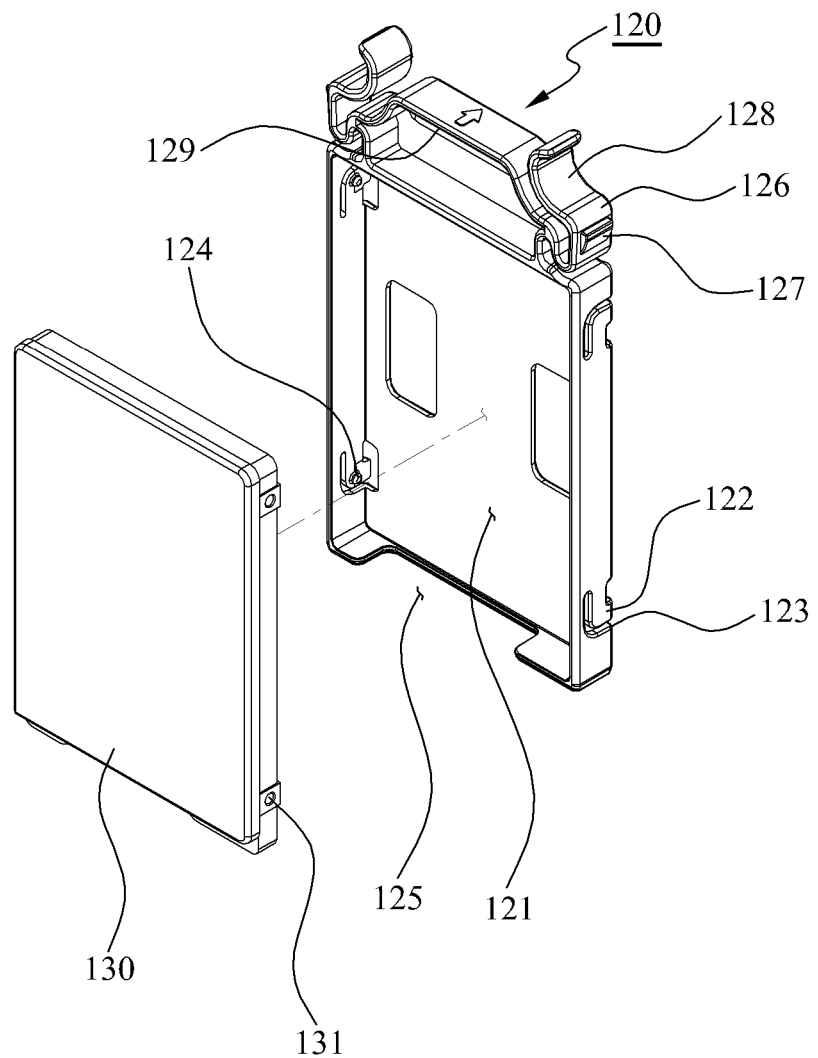
FIG. 5 is a front perspective view illustrating a structure, in which the saving unit tray is coupled to the saving unit, of the saving device attachment/detachment structure of the POS device according to an embodiment of the present invention.

As illustrated in FIGS. 4 and 5, in order to accommodate the saving unit 130 in the saving unit tray 120, the saving unit tray 120 further includes: a saving unit coupling part 121 formed to accommodate the saving unit 130 therein; and a saving unit connector opening 125 formed at a bottom surface thereof so as to expose the saving unit connector 132.

The above-described saving unit tray 120 may be may be embodied in various forms. In an embodiment, as illustrated in FIGS. 4 and 5, the saving unit tray 120 may further include a mounting curved elastic part 126 disposed at an upper side of each of both side surfaces of the saving unit tray 120 and including a mounting stopper 127 having elasticity and inserted into the stopper coupling groove 112 when the saving unit tray 120 is inserted and mounted to the saving unit mounting unit 110.

When the saving unit tray 120 is detached from the saving unit mounting unit 110, as illustrated in FIGS. 4 and 5, a mounting handle 128 may be formed on an end of the mounting curved elastic part 126 in order to detach the mounting stopper 127 from the stopper coupling groove 112 by easily pushing the mounting curved elastic part 126. In this case, as illustrated in FIGS. 4 and 5, an insertion handle 129 may be further formed at an upper side of the saving unit tray in order to detach the saving unit tray 120 in a pulling manner.

Through the above-described configuration, a time for detaching the saving unit tray 120 from the saving unit mounting unit 110 and then inserting and mounting another saving unit tray 120 for replacement (or upgrade) takes only several seconds to tens seconds or more. Accordingly, a service unavailable time of the POS device according to the saving unit replacement may be remarkably reduced.

Next, the saving unit 130 will be described. The saving unit 130 typically includes a hard disk driver (HDD). As illustrated in FIGS. 4 and 5, the saving unit 130 is accommodated in and coupled to the saving unit tray 120. Also, the saving unit 130 may include various saving units such as a SSD memory.

As illustrated in FIG. 3, when the saving unit tray 120 is inserted and mounted to the saving unit mounting unit 110, as the saving unit 130 includes the saving unit connector 132 that is connected to the main substrate connector 40, the saving unit connector 132 may be directly connected to the main substrate connector 40 by only inserting and mounting the saving unit tray 120 to the saving unit mounting unit 110. In this case, each of the saving unit connector 132 and the main substrate connector 40 may be a serial ATA (SATA) standard connector.

As described above, the saving unit 130 may include various kinds of saving media such as HDD or SSD memory as well as widely used saving media according to various saving capacities and standards. To this end, as illustrated in FIGS. 4 and 5, the saving unit 130 may further include a coupling groove 131 that is formed at one portion or more of the both side surface of the saving unit 130. In this case, the coupling groove 131 may be formed to have a predetermined arrangement standard with respect to the saving media having various standards and kinds. The coupling groove 131 may be formed directly in the saving unit 130 to have the predetermined arrangement standard, and also formed in an additionally member and then attached to the saving unit 130 to have the predetermined arrangement standard.

Also, as illustrated in FIGS. 4 and 5, the saving unit tray 120 may further include elastic coupling mounting units 122 each providing elasticity to each of saving unit coupling projections 124 through a cut groove 123, which are inserted into coupling grooves 131, respectively. Through the above-described configuration, the saving unit 130 having various kinds and standards may be universally coupled to the saving unit tray 120.

Next, a card reader bidirectional mounting structure 200 of the POS device according to an embodiment of the present invention will be described. Hereinafter, for clarity of description, a direction toward the POS device main body 10 indicates an 'inward direction', and the opposite direction indicates an 'outward direction'.

Figure 8:
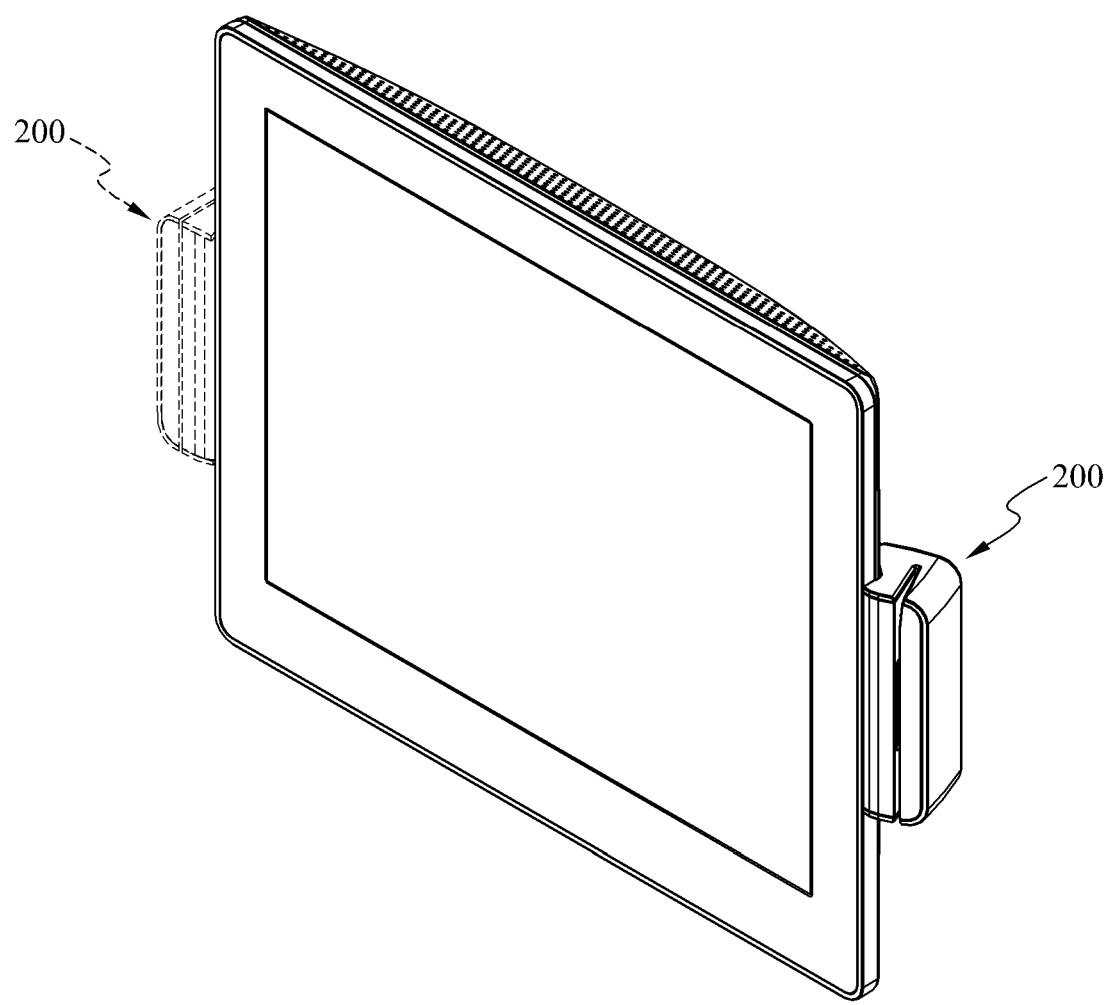
FIG. 8 is a front perspective view illustrating an entire appearance of a card reader bidirectional mounting structure of the POS device according to an embodiment of the present invention.
Figure 9:
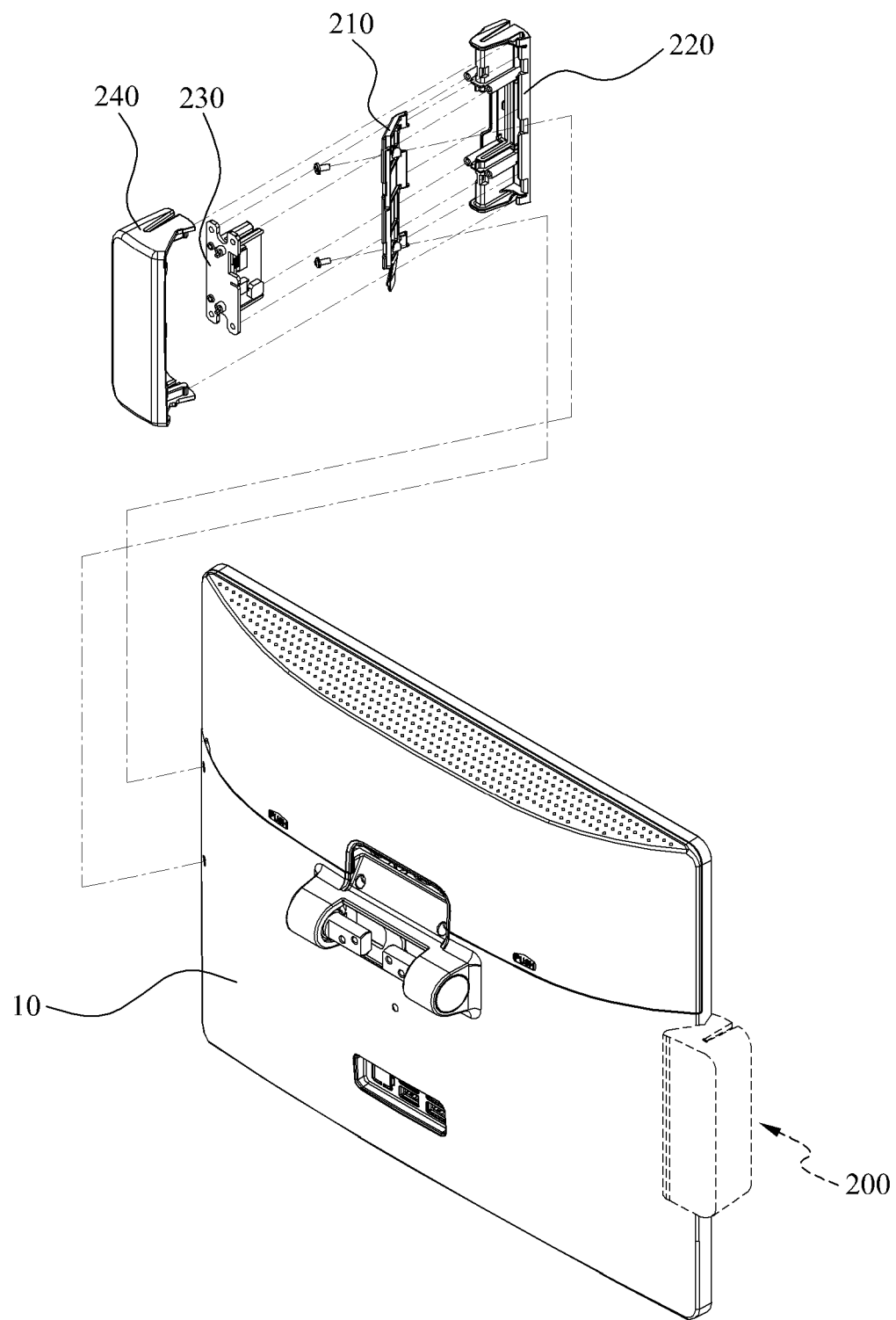
FIG. 9 is an exploded perspective view illustrating an entire rear surface of the card reader bidirectional mounting structure of the POS device according to an embodiment of the present invention.

As illustrated in FIGS. 8 and 9, the card reader bidirectional mounting structure 200 of the POS device according to the present invention includes a mounting bracket 210, a card reader front cover 220, a card read rear cover 240, and a card reading assembly 230.

Firstly, the mounting bracket 210 will be described. As illustrated in FIGS. 8 and 9, the mounting bracket 210 is installed on at least one of a left side or a right side of the POS device main body 10. In this case, as illustrated in FIG. 9, the mounting bracket 210 may be mounted by using a mounting screw or attached to or integrated with the POS device main body 10.

Figure 10:
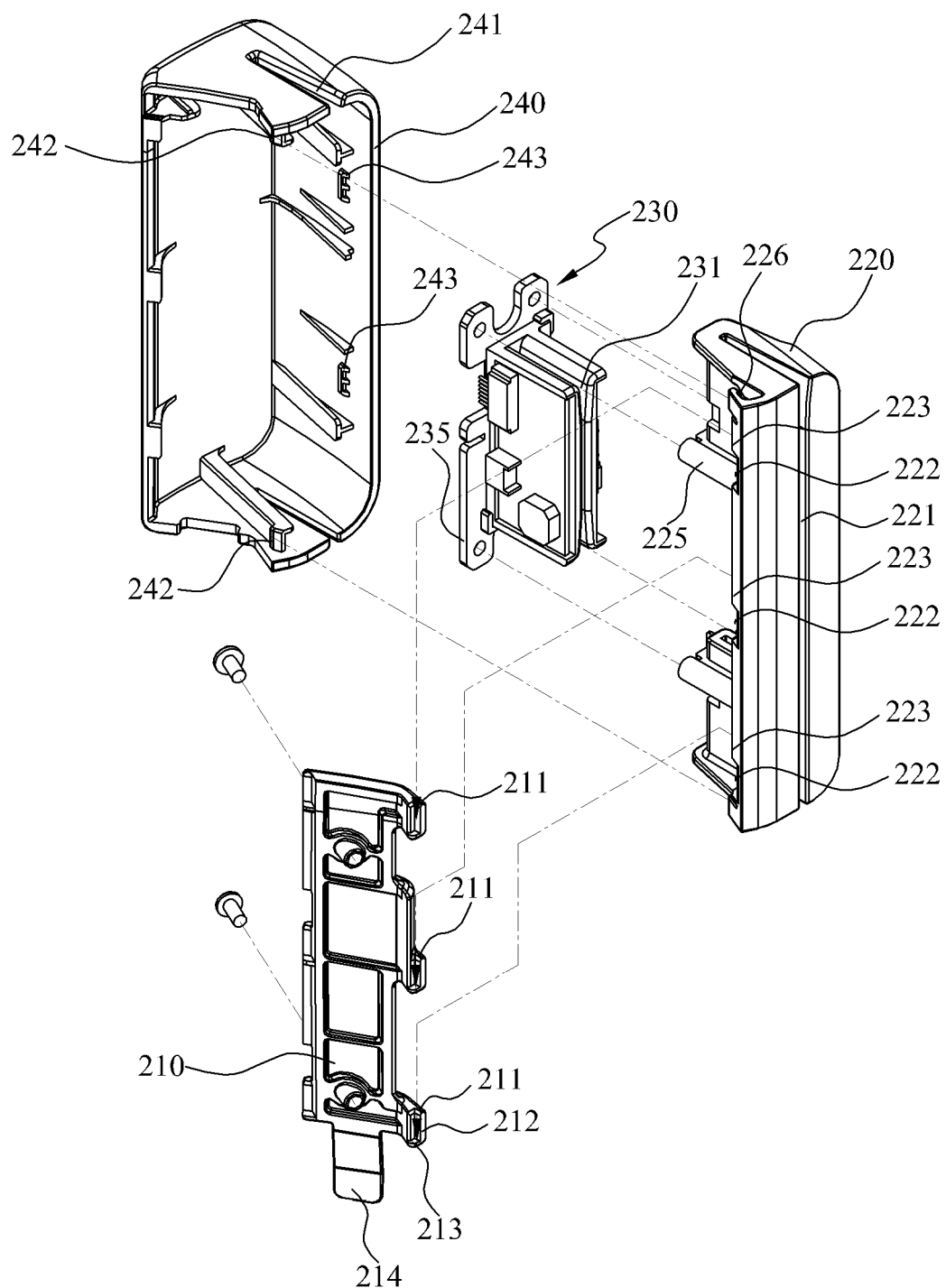
FIG. 10 is an exploded coupling view illustrating the card reader bidirectional mounting structure of the POS device according to an embodiment of the present invention.

When the mounting bracket 210 is installed on at least one of the left side or the right side of the POS device main body 10 in a detachable manner, as illustrated in FIG. 10, the mounting bracket 210 may further include a handle 214 that is formed on at least one of an upper side or a lower side of the mounting bracket 210 for operational convenience.

Next, the card reader front cover 220 will be described. As illustrated in FIG. 10, the card reader front cover 220 includes a front cover slot 221, through which a card passes, formed at a front surface thereof, and is coupled to the mounting bracket 210 in an attachable/detachable manner.

Figure 12:
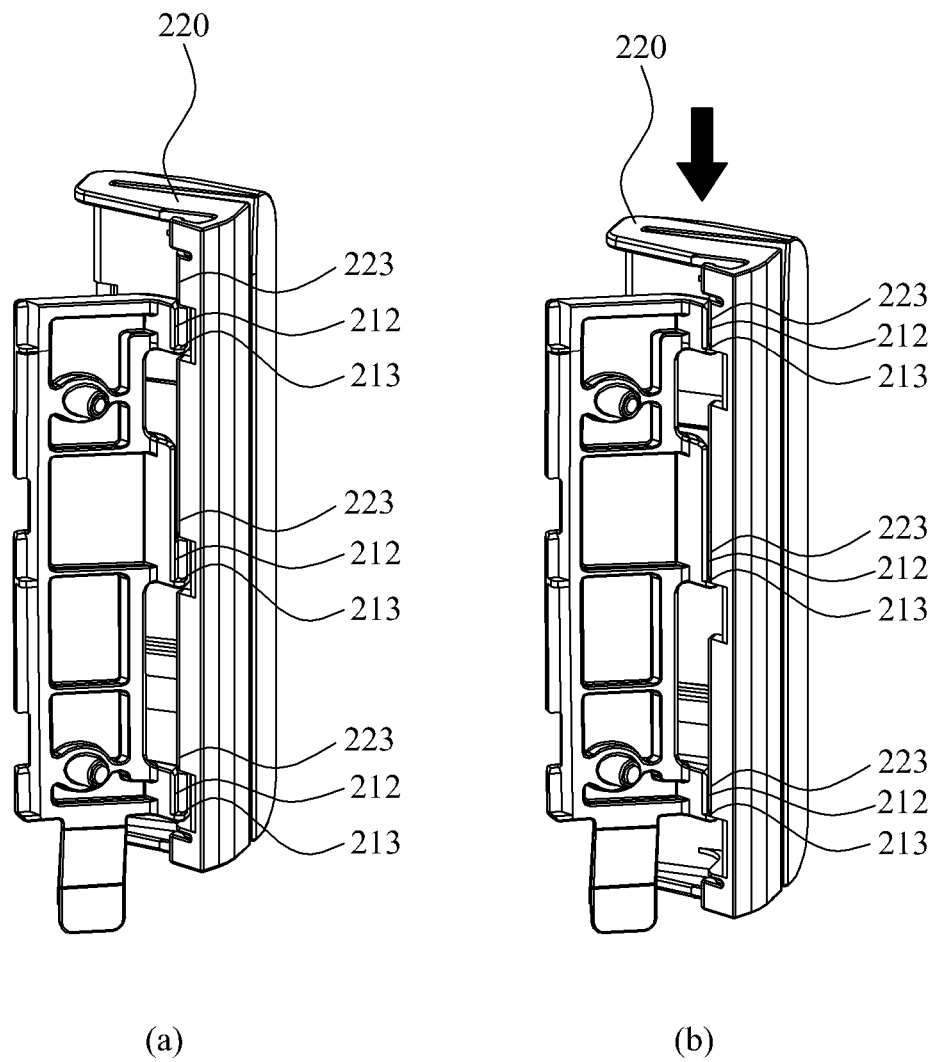
FIG. 12 is a perspective view illustrating a coupling process between the mounting bracket and the card reader front cover of the card reader bidirectional mounting structure of the POS device according to an embodiment of the present invention.

In this case, a configuration in which the card reader front cover 220 is coupled to the mounting bracket 210 in the attachable/detachable manner may be embodied in various forms. As one embodiment, as illustrated in FIG. 10, the mounting bracket 210 may further include a front cover attachment/detachment fixing part 211 formed on at least two portions of a front surface thereof and including a side wall 212 and a stopper 213 to have an "L" shape. In this case, in correspondence to the above-described configuration as in FIGS. 10 and 12, the card reader front cover 220 may further include: a fixing unit through-hole 222 formed therein so that the front cover attachment/detachment fixing part 211 passes therethrough; and a coupling side wall 223 formed consecutively to the fixing unit through-hole 222 and inserted and coupled to the side wall 212 and the stopper 213. Through the above-described configuration, the card reader front cover 220 may be coupled to the mounting bracket 210 in an extremely simple and firm manner by arranging the front cover attachment/detachment fixing part 211 at the fixing through-hole 222 of the card reader front cover 220 to pass therethrough as illustrated in FIG. 12A, and then pushing downward the card reader front cover as illustrated in FIG. 12B. Here, a process of separating the card reader front cover 220 from the mounting bracket 210 may be easily implemented by performing the opposite process.

Figure 11:
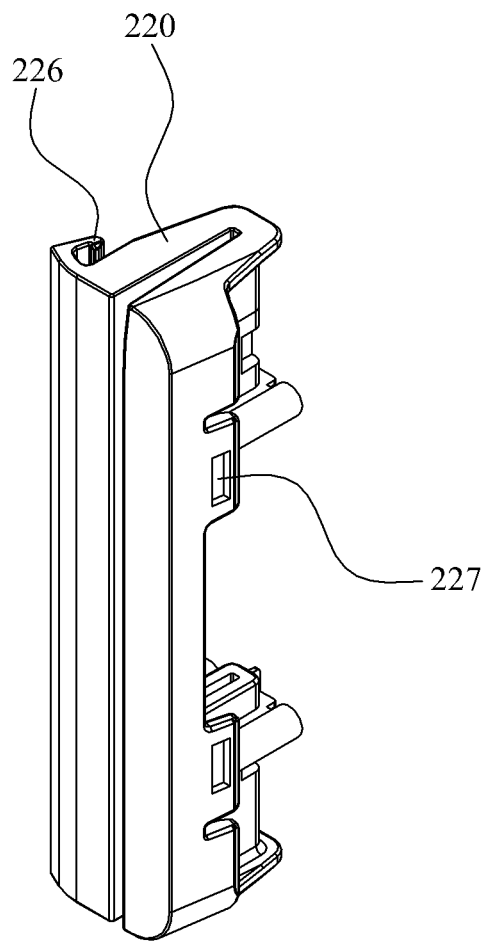
FIG. 11 is a perspective view illustrating a card reader front cover of the card reader bidirectional mounting structure of the POS device according to an embodiment of the present invention.

Next, the card reader rear cover 240 will be described. As illustrated in FIGS. 9 and 10, the card reader rear cover 240 is coupled to the card reader front cover 220 in a detachable manner. Here, a configuration in which the card reader rear cover 240 is coupled to the card reader front cover 220 in a detachable manner may be embodied in various forms. In an embodiment as illustrated in FIGS. 10 and 11, the card reader front cover 220 may further include: a rear cover coupling projection 226 formed at each of an upper side and a lower side in an inward direction of the inside thereof; and a coupling groove 227 formed at each of at least two portions in an outward direction of the inside thereof, and the card reader rear cover 240 may further include: a first coupling projection 242 formed at each of an upper side and a lower side in an inward direction of the inside thereof so as to be coupled to the rear cover coupling projection 226 in an attachable/detachable manner; and a second coupling projection formed at each of an upper side and a lower side in an outward direction of the inside thereof so as to be coupled to the rear cover coupling projection 226 in an attachable/detachable manner. Through the above-described configuration, the card reader rear cover 240 may be coupled to or detached from the card reader front cover 220 without an additional tool.

Next, the card reading assembly 230 will be described. As illustrated in FIGS. 9 and 10, the card reading assembly 230 is installed in the card reader front cover 220 and the card reader rear cover 240 to read information recorded in the card. In this case, the card reading assembly 230 may include a card guide slot 231 that guides the card to pass therethrough at an exact reading position. As illustrated in FIG. 10, as the card reading assembly 230 further includes a card reading assembly installation unit 235, and the card reader front cover further includes a card reading assembly coupling unit 225, the card reading assembly installation unit 235 may be coupled to the card reading assembly coupling unit 225 through a fixing screw or the like.

When the card reader bidirectional mounting structure 200 of the POS device is mounted to a left side or a right side of the POS device main body 10 on the basis of characteristics of the card reader bidirectional mounting structure of the POS device according to an embodiment of the present invention, the top and bottom of the card reader bidirectional mounting structure 200 of the POS device may be converted according to a mounding direction. Even in this case, the card reading assembly 230 may desirably be the bidirectional card reading assembly, which may read information recorded in the card even when the card passes in any direction, for easy usage by unifying a direction in which the card passes into a downward direction for convenience of the user.

Next, the input/output port (hereinafter, referred to as an I/O port) mounting unit integrated type display frame 300 of the POS device according to an embodiment of the present invention will be described.

Figure 13:
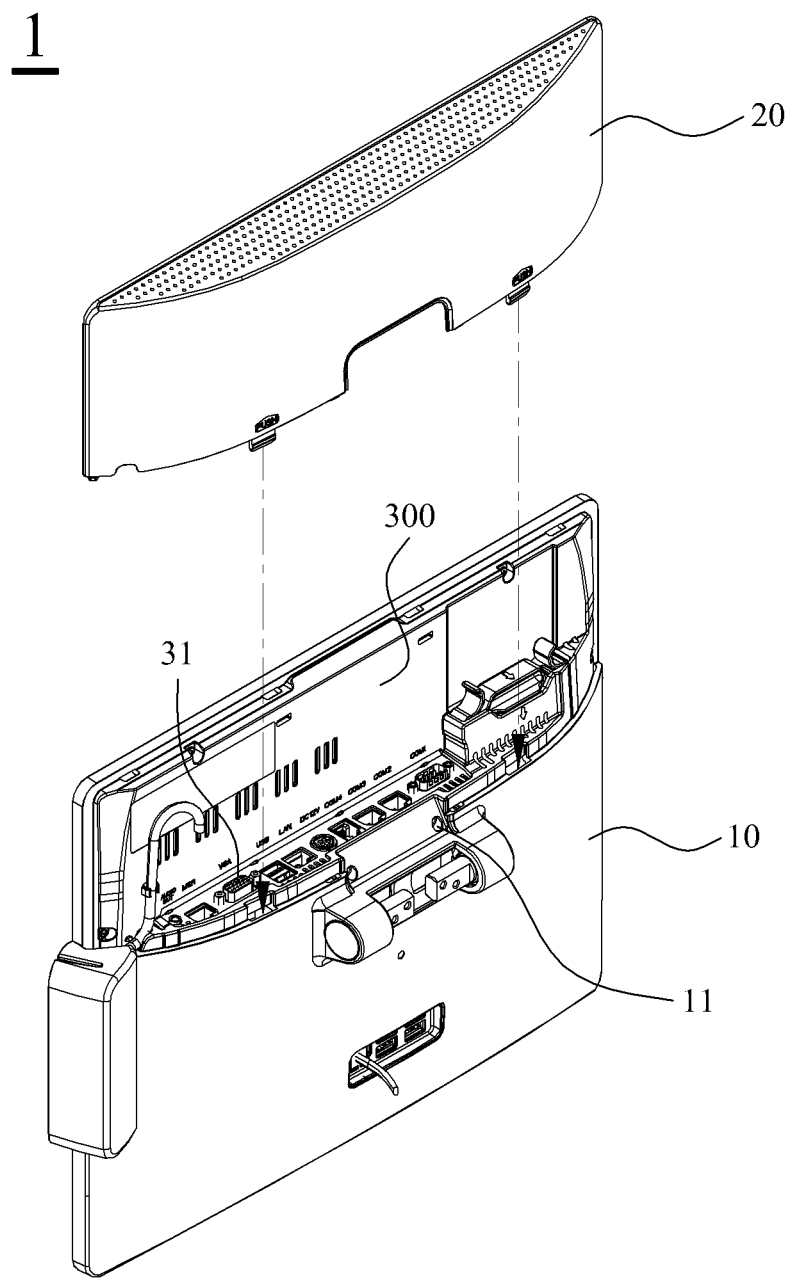
FIG. 13 is a view illustrating a rear structure of an input/output port mounting unit integrated type display frame of the POS device according to an embodiment of the present invention.

As illustrated in FIG. 13, the I/O port mounting unit integrated type display frame 300 of the POS device according to an embodiment of the present invention is mainly used for the POS device including a cover 20 that is coupled to an upper side of a rear case 10 in an attachable/detachable manner and exposes the I/O port mounting unit 320 when detached. However, the embodiment of the present invention is not limited thereto. For example, the I/O port mounting unit integrated type display frame 300 of the POS device may be used for a POS device including I/O ports having various structures.

Figure 14:
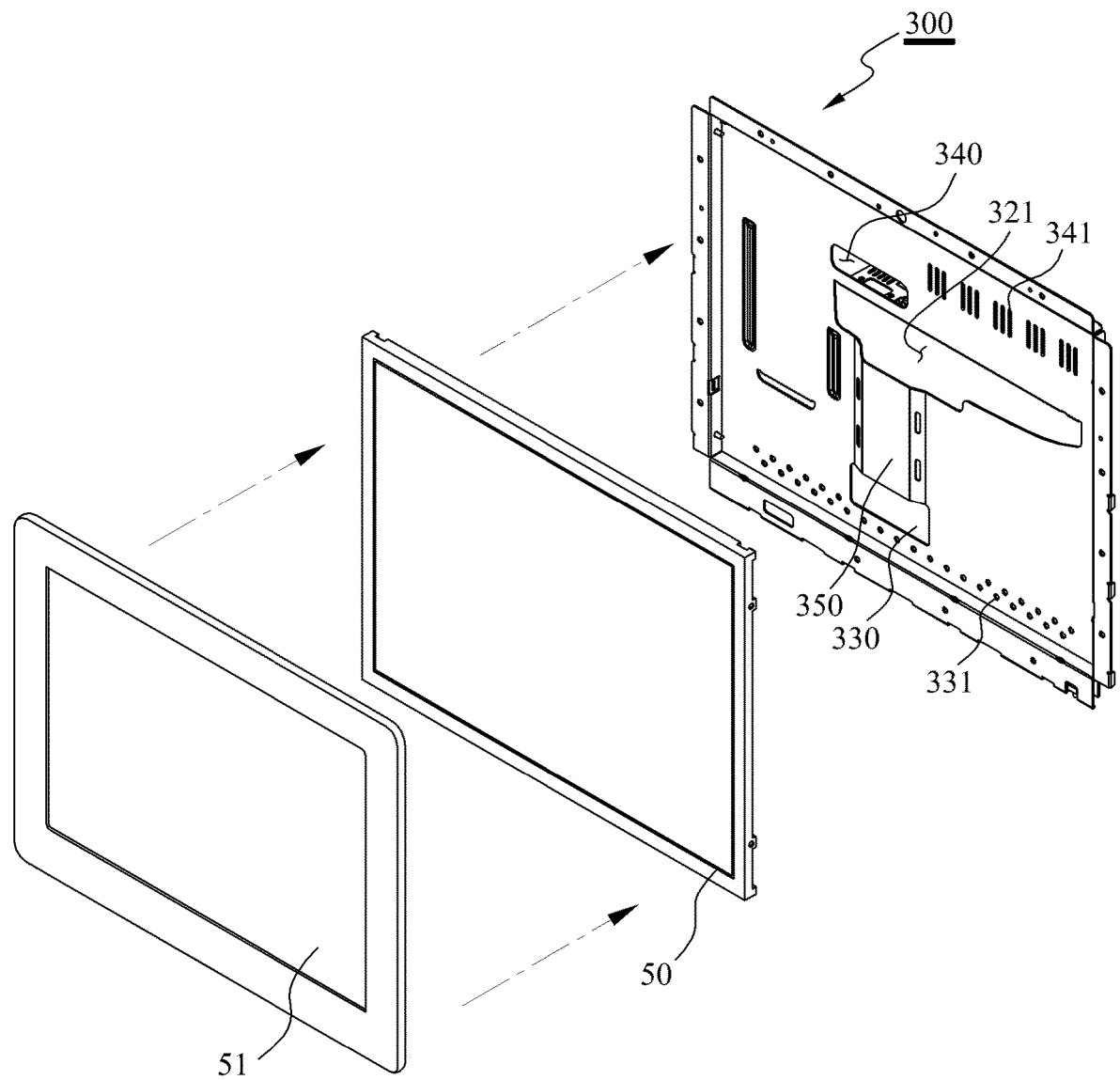
FIG. 14 is a front exploded perspective view illustrating the input/output port mounting unit integrated type display frame of the POS device according to an embodiment of the present invention.
Figure 15:
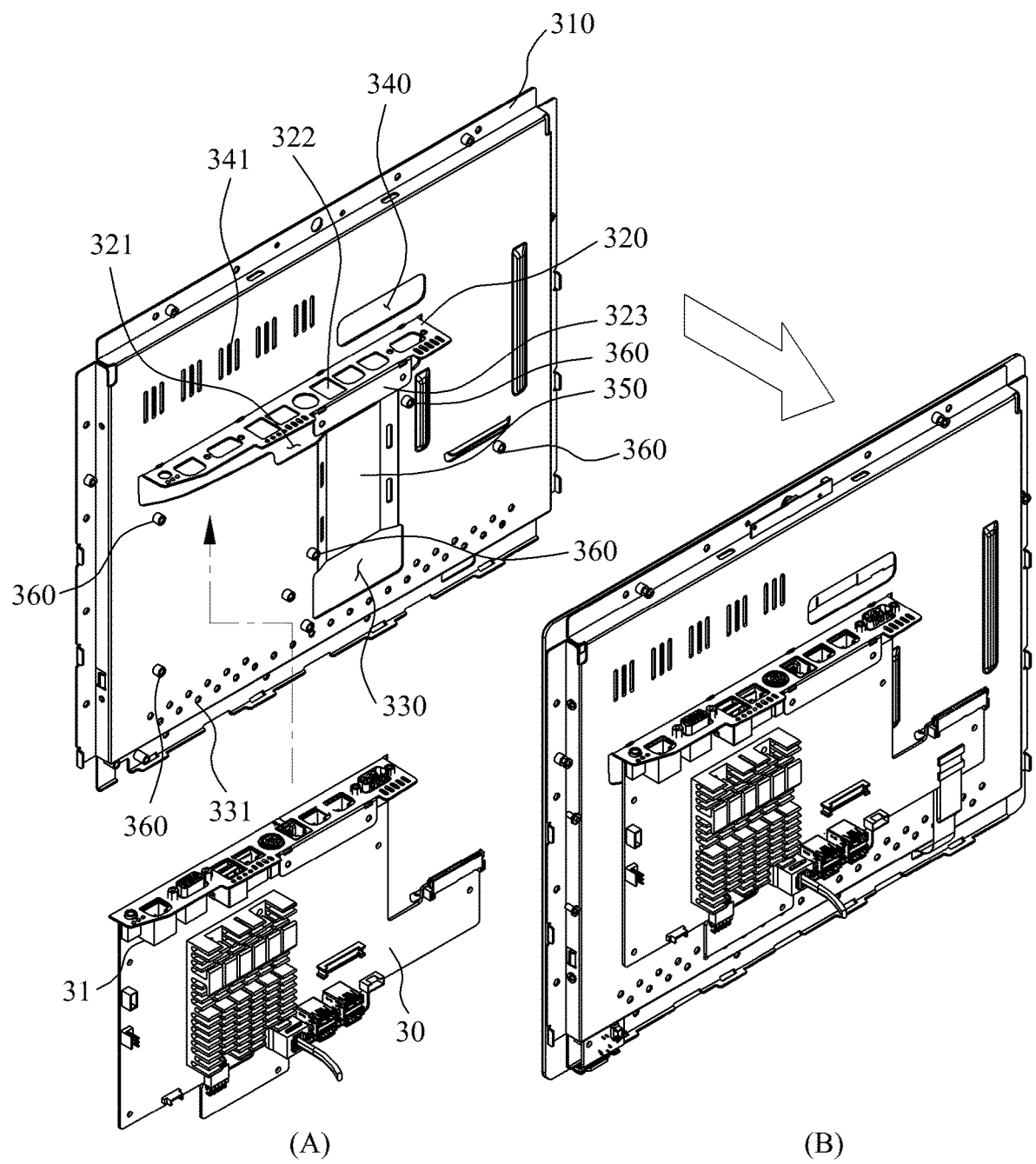
FIG. 15 is a rear perspective view illustrating the input/output port mounting unit integrated type display frame of the POS device according to an embodiment of the present invention.

As illustrated in FIGS. 14 and 15, the I/O port mounting unit integrated type display frame 300 for the POS device includes a display panel mounting unit 310, in which a display panel 50 is inserted and loaded, formed at a front surface thereof. In this case, although the display panel 50 may be mounted through a screw hole defined in a side surface of the I/O port mounting unit integrated type display frame 300 of the POS device by using a mounting screw, the embodiment of the present invention is not limited to the mounting method. For example, the display panel 50 may be mounted through various embodiments. Also, as illustrated in FIG. 14, a touch panel 51 may be additionally mounted to an outer side of the display panel 50.

Figure 16:
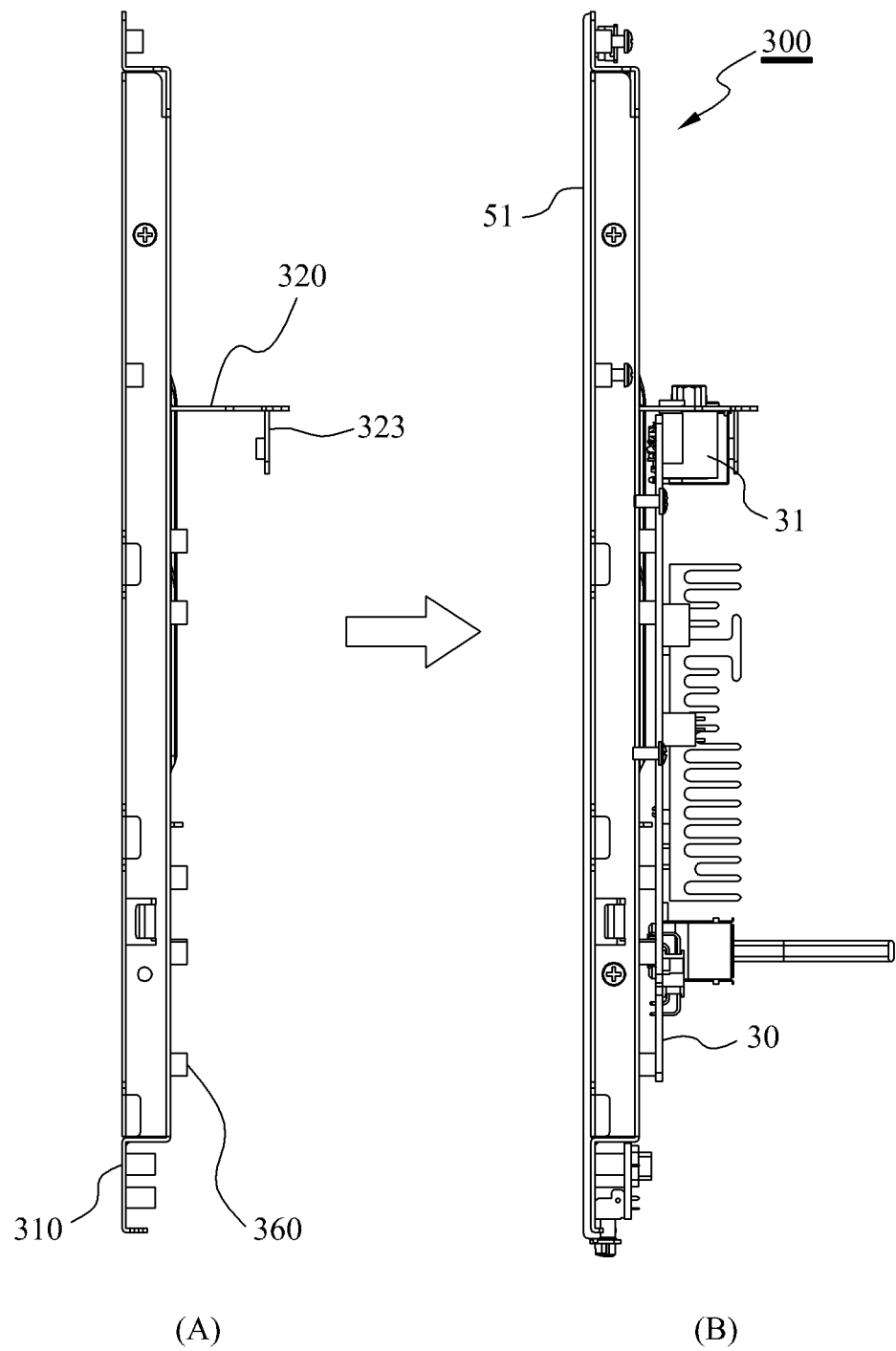
FIG. 16 is a side view illustrating the input/output port mounting unit integrated type display frame of the POS device according to an embodiment of the present invention.

As illustrated in FIGS. 15 and 16, the I/O port mounting unit integrated type display frame 300 of the POS device includes the I/O port mounting unit 320 formed at a rear surface thereof and having an I/O port mounting hole 322, in which an I/O port 31 provided at a main substrate 30 is inserted and coupled. The I/O port mounting unit has a unit cut from an I/O port mounting unit perforation 321 and is formed to be bent towards the rear direction so as to be protruded therefrom. That is, the I/O port mounting unit 320 is constituted by a portion of the /O port mounting unit integrated type display frame 300 of the POS device, instead of being separately manufactured and then assembled. Accordingly, through the above-described extremely efficient single structure, the display panel, the main substrate, and the I/P port of the main substrate may be mounted to each other in a mechanically firm manner, and manufacturing costs and efficiency of the manufacturing process may be enhanced.

Also, as the I/O port mounting unit perforation 321 is configured to have a cut unit, which serves as a ventilation hole for a unit constituting the I/O port mounting unit 320, an ascending air current, which is generated due to heat generation of the display panel 50 or the main substrate 30, is smoothly flown and circulated with a lower main ventilation hole 330, which will be described later, efficient heat discharge may be performed even during a long time operation without an additional circulation unit.

As illustrated in FIGS. 15 and 16, the lower main ventilation hole 330 is formed at a lower side of a rear surface of the I/O port mounting unit integrated type display frame 300 of the POS device.

Also, as a recessed kernel 350, which is recessed inward, is formed between the I/O port mounting unit perforation 321 and the lower main ventilation hole 330, an effective area of a fluid passage, through which a fluid is circulated while discharging heat generated from the main substrate 30, increases, and the air circulation for heat discharge is desirably further smoothly performed.

In this case, for more smooth air circulation, as illustrated in FIGS. 14 and 15, the I/O port mounting unit integrated type display frame 300 of the POS equipment according to an embodiment of the present invention further includes: an upper first ventilation hole 340 formed at an upper side of the I/O port mounting unit perforation 321; a plurality of upper second ventilation holes 341 formed at the upper side of the I/O port mounting unit perforation 321; and a plurality of lower auxiliary ventilation hole 331 formed at a lower side of the lower main ventilation hole 330.

Figure 17:
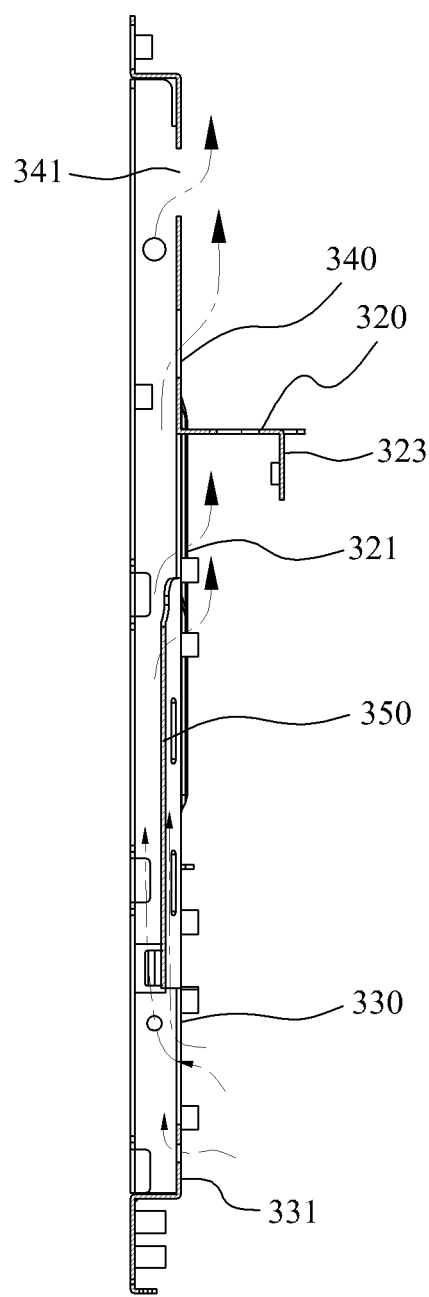
FIG. 17 is a view illustrating an air circulation structure of the input/output port mounting unit integrated type display frame of the POS device according to an embodiment of the present invention.

Through the above-described structure, the I/O port mounting unit integrated type display frame 300 of the POS device according to an embodiment of the present invention may allow the ascending air current generated by the heat generation of the display panel 50 or the main substrate 30 to be smoothly circulated as illustrated by an arrow in FIG. 17, to effectively discharge the heat even during a long time operation.

Also, as illustrated in FIGS. 15 and 16, the I/O port mounting unit integrated type display frame 300 of the POS device desirably further includes a main substrate mounting unit 360, to which the main substrate 30 is mounted and fixed, so as to mechanically couple and fix the main substrate 30.

Also, as described above, when the POS device 1 is characterized by including the cover 20 that is coupled to the upper side of the rear case 10 and exposes the I/O port mounting unit 320 when detached, as illustrated in FIGS. 15 and 16, as the I/O port mounting unit 320 is further formed with a rear case coupling part 323 so that an end thereof is consecutively bent and fixed to the rear surface case 10, and coupled through a frame coupling through-hole 11 formed in the rear surface case 10 by using a coupling unit such as a bolt and a nut, the I/O port mounting unit integrated type display frame 300 of the POS device may be coupled to the rear surface case 10 in a mechanically firm manner.

Next, the hinge coupling structure 400 of the POS device according to an embodiment of the present invention will be described.

Figure 18:
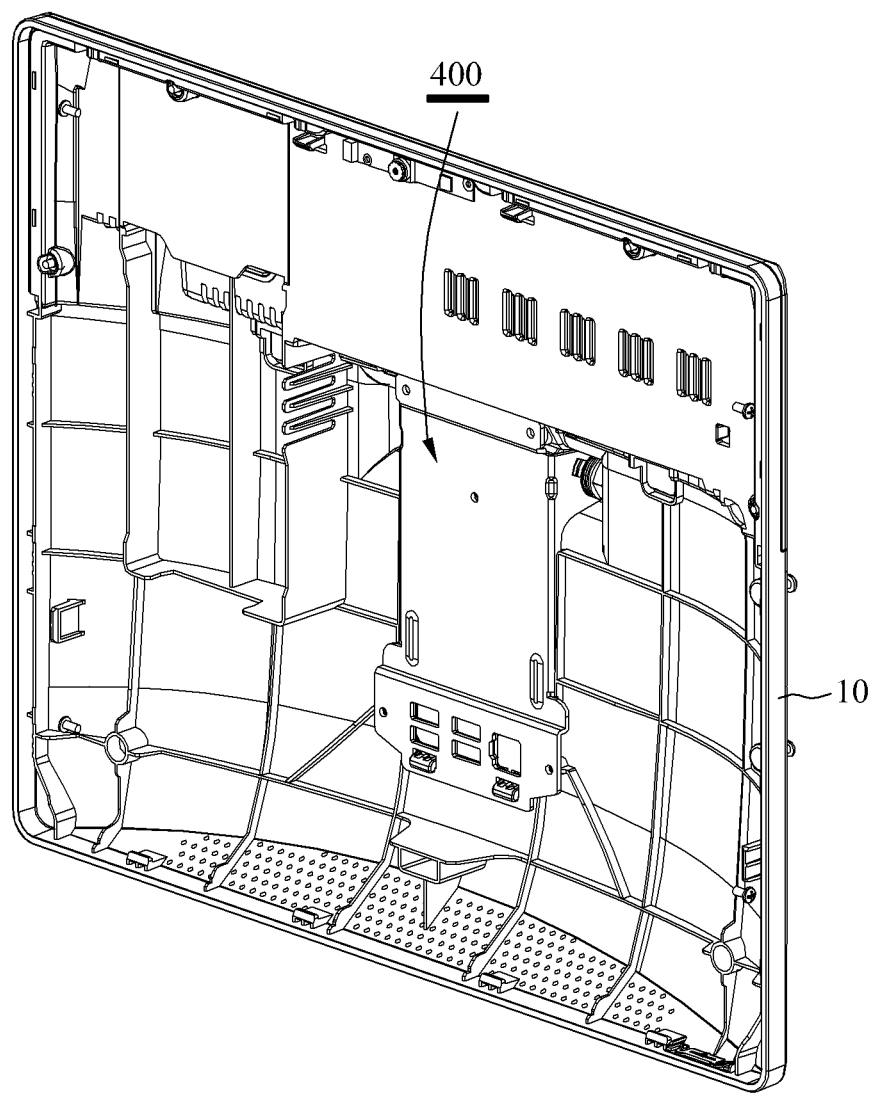
FIG. 18 is a view illustrating the inside of a rear surface case of a POS device applied with a hinge coupling structure of the POS device according to an embodiment of the present invention.

As illustrated in FIG. 18, the hinge coupling structure 400 of the POS device according to an embodiment of the present invention is mainly used for the POS device including the rear surface case 10. However, the embodiment of the present invention is not limited thereto. For example, the hinge coupling structure 400 of the POS device according to an embodiment of the present invention may be used for the POS device including I/O ports having various structures.

Figure 19:
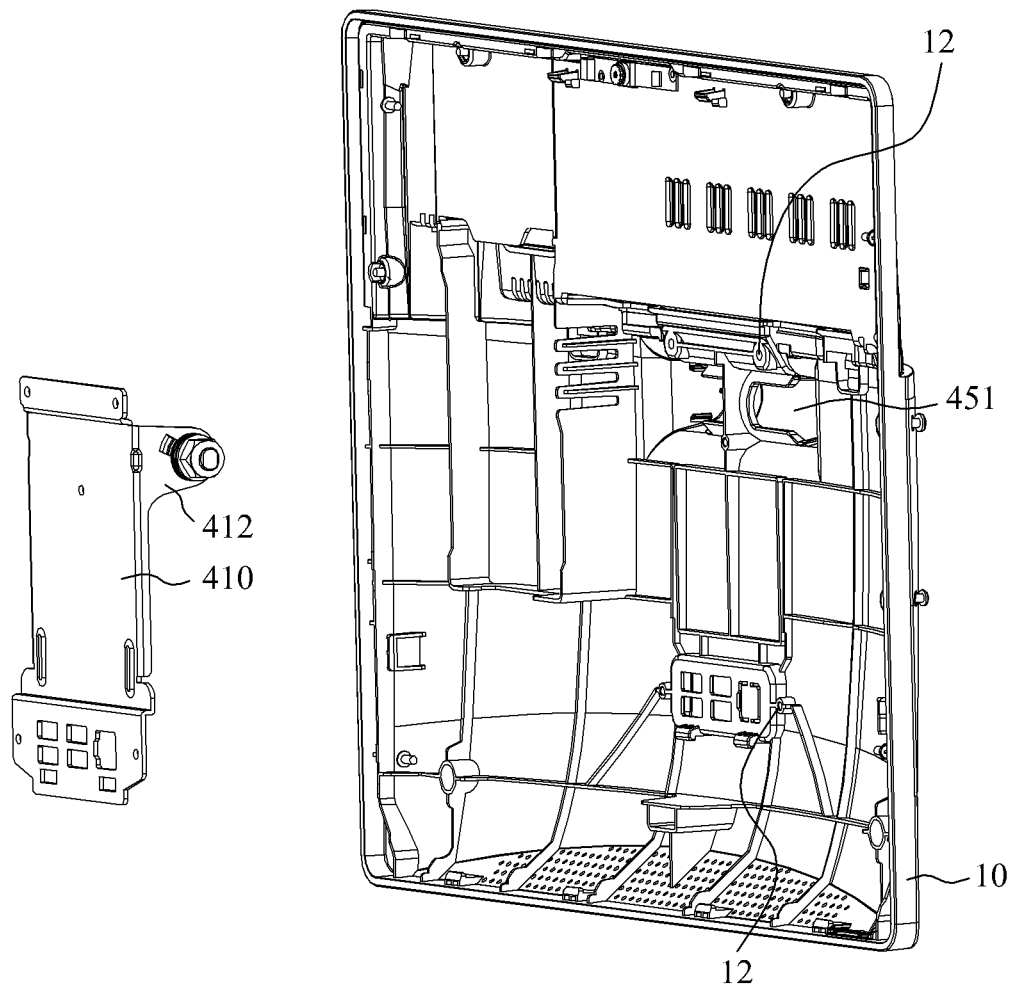
FIG. 19 is a rear exploded coupling view illustrating the hinge coupling structure of the POS device according to an embodiment of the present invention.
Figure 20:
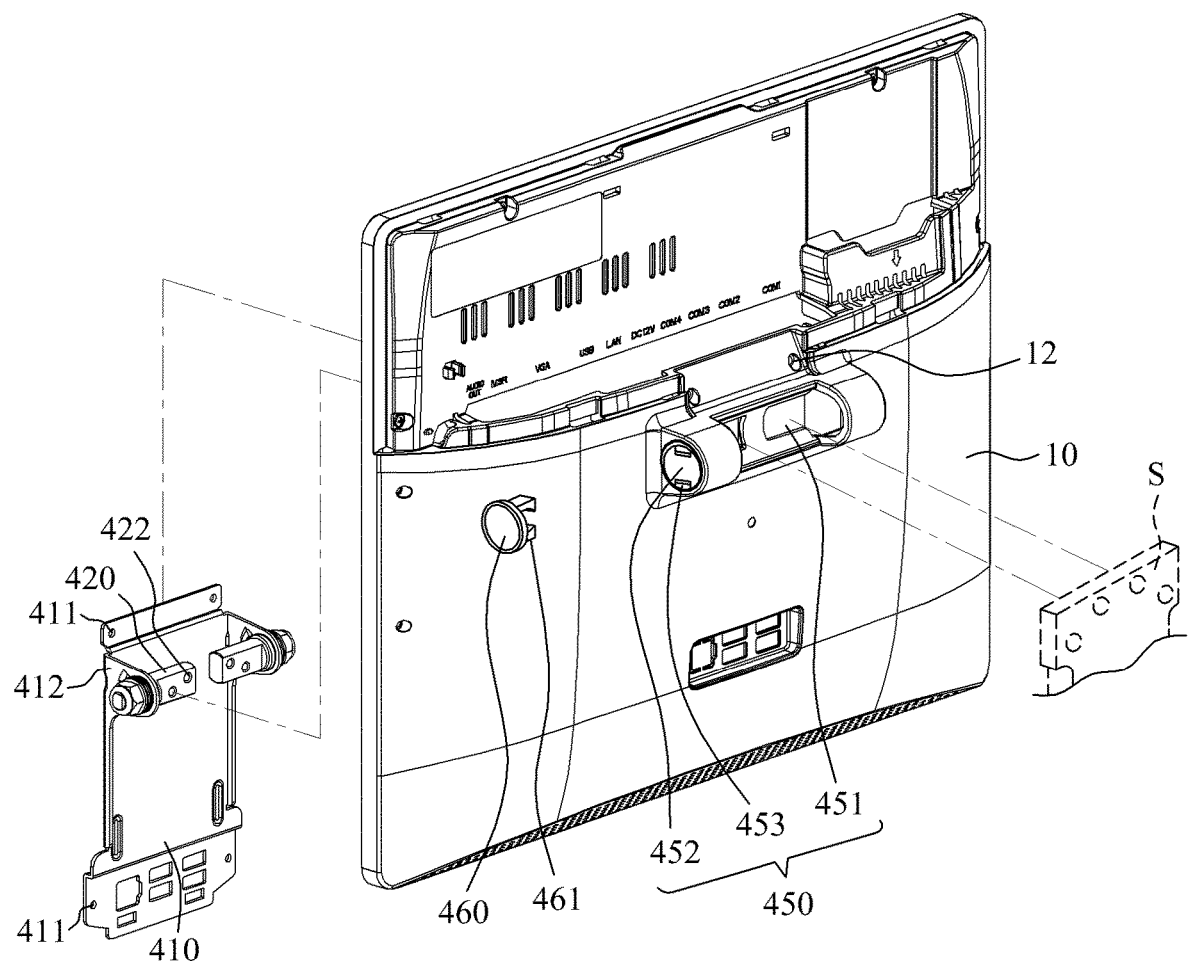
FIG. 20 is an exploded coupling view illustrating the hinge coupling structure of the POS device according to an embodiment of the present invention.

As illustrated in FIGS. 19 and 20, the hinge coupling structure 400 of the POS device according to an embodiment of the present invention includes a hinge bracket 410 mounted inside the rear surface case 10 and is formed with a hinge shaft installation part 412 formed with a hinge shaft coupling hole 413 and bent backward from each of both side surfaces thereof.

In this case, a configuration in which the hinge bracket 410 is mounted inside the rear surface case 10 may be embodied in various forms. In an embodiment, as illustrated in FIG. 19, the hinge bracket 410 may further include a hinge bracket coupling through-hole 411 formed in the hinge bracket 410 so that a coupling unit such as a coupling screw or a coupling bolt is coupled to the hinge bracket mounting through-hole 12 formed in the rear surface case 10 while passing therethrough.

Figure 21:
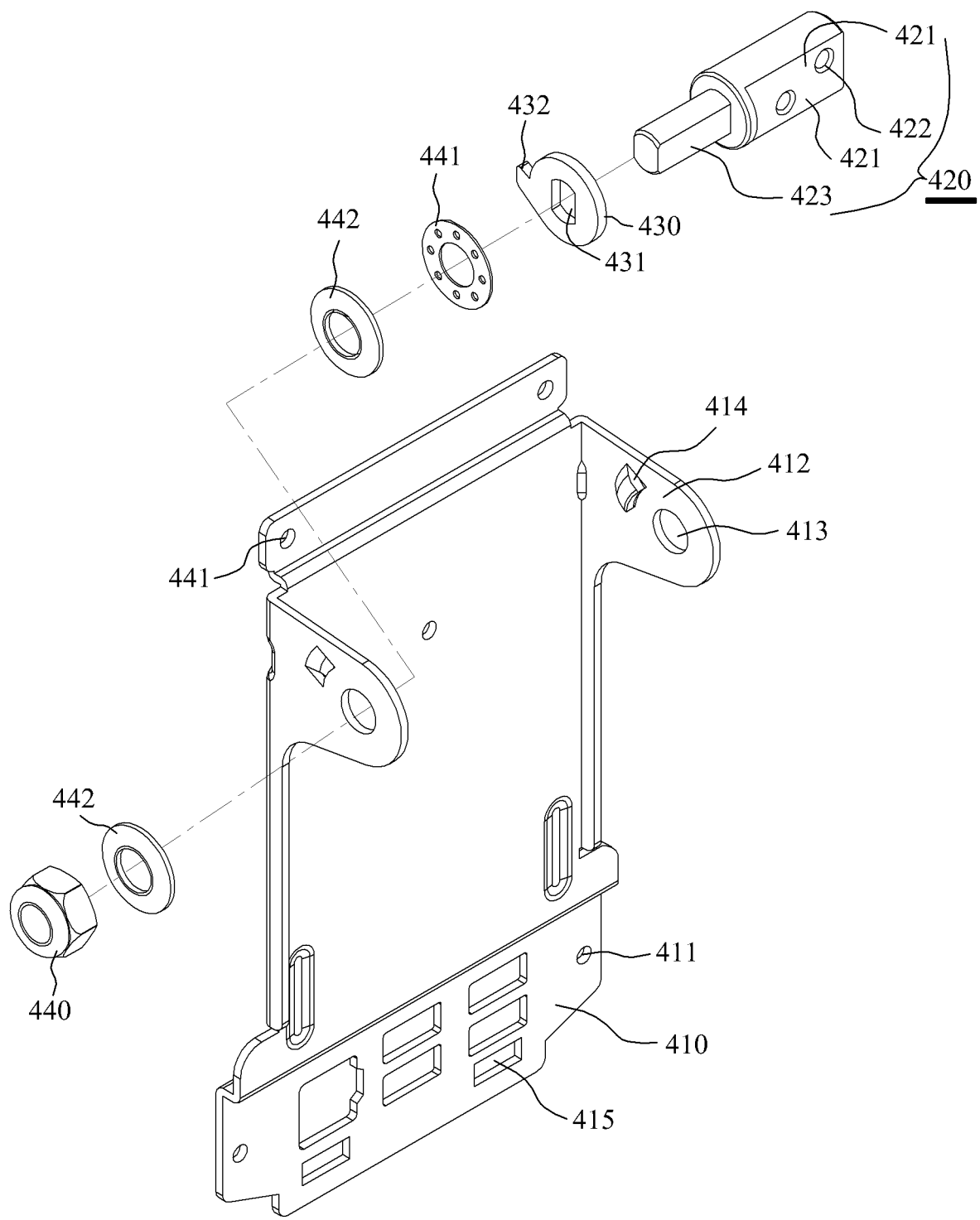
FIG. 21 is an exploded coupling view illustrating a configuration of coupling between a hinge bracket and a hinge shaft of the hinge coupling structure of the POS device according to an embodiment of the present invention.

As illustrated in FIGS. 20 and 21, in the hinge bracket 410, a hinge shaft 420 is inserted and coupled to the hinge shaft coupling hole 413 in a direction from the inside to the outside thereof. In this case, as illustrated in FIG. 21, the hinge shaft 420 includes a flat part 421 disposed on an inward side and a flat screw part 423 disposed on an outward side (wherein, the 'inward side' indicates a direction toward a space between the hinge shaft installation parts 412 formed at both sides of the hinge bracket 410, and the 'outward side' indicates an outward direction of each of the hinge shaft installation parts 412.

As illustrated in FIG. 21, the flat part 421 is formed with a stand coupling screw hole 422 coupled to a stand S while having a diameter greater than that of the hinge shaft coupling hole 413 and both side surfaces, which are process to be flat. Also, as illustrated in FIG. 21, the flat screw part 423 is configured to pass through the hinge shaft coupling hole 413 and protrude outward, and has both side surfaces, which is processed to be flat and on which a screw thread is formed.

As illustrated in FIG. 21, disk springs 442 are inserted into the flat screw part 423 with the hinge shaft installation part 412 therebetween. Also, as illustrated in FIG. 21, a coupling nut 440 is coupled to the flat screw part 423. Through the above-described configuration, while each of the disk springs 442 closely contacts and compresses the hinge shaft installation part 412 with a predetermined pressure, the hinge shaft 420 may be installed to receive a predetermined friction force with respect to the hinge shaft installation part 412. Accordingly, through the above-described configuration in which the hinge shaft 420 is installed while having a predetermined friction force with respect to the hinge shaft installation part 412, stable fixing and easy angle adjustment may be performed at the same time.

In this case, the coupling nut 440 may be a nylon nut so as to provide proper elasticity and simultaneously prevent the coupling nut from being loose. Also, the appropriate number of washer 441 may be additionally inserted and installed at appropriate positions between the disk spring 442 and the coupling nut 440 when necessary.

The rotation of the hinge shaft 420 is sometimes required to be restricted within a predetermined range (that is, an angle of the display of the POS device is necessarily greater than a predetermined range). To this end, as illustrated in FIG. 21, the hinge shaft installation part 412 may further include a protruding stopper 414 that protrudes inward the hinge shaft installation part 412. Also, as illustrated in FIG. 21, the hinge shaft 420 may further include a hinge stopper 420 including a flat screw part coupling hole 431 through which the flat screw part 423 is coupled and a stopper arm 432 restricting the rotation of the hinge shaft 420 while contacting the protruding stopper 414.

As illustrated in FIG. 20, for mechanical protection and appearance, the rear surface case 10 may further include a hinge installation unit 450 including a hinge shaft through-hole 451, which protrudes in a backward direction of the rear surface case 10 to surround the hinge shaft 420 and through which the hinge shaft 420 passes, and a hinge cap installation part 452 formed at an outer side thereof. In this case, as illustrated in FIG. 20, a hinge cap 460 may be mounted to the hinge cap installation part 452 in a detachable manner. For the above-described mounting structure, as illustrated in FIG. 20, a hinge cap fixing hole 453 may be further formed in the hinge cap installation part 452, and a hinge cap fixing projection 461 may be further formed in the hinge cap 460.

Also, as illustrated in FIG. 21, a port installation hole 415, which allows various kinds of I/O ports (not shown) to be installed, may be further formed in the hinge bracket 410 so as to further efficiently utilize characteristics of the hinge bracket 410 coupled to the rear surface case 10 in a mechanically firm manner.

Hereinabove, the preferred embodiments are disclosed in the drawings and specification. While specific terms were used, they were not used to limit the meaning or the scope of the present invention described in claims, but merely used to explain the present invention. Accordingly, a person having ordinary skill in the art will understand from the above that various modifications and other equivalent embodiments are also possible. Hence, the real protective scope of the present invention shall be determined by the technical scope of the accompanying claims.

The invention claimed is:

1. A POS device (1) provided with a cover (20) coupled to an upper side of a rear surface case (10) in an attachable/detachable manner, comprising:
    a saving device attachment/detachment structure (100) comprising:
        a saving unit mounting unit (110) formed at a portion of the rear surface case (10) and disposed at an upper side of a main substrate connector (40) mounted to a main substrate (30);
        a saving unit tray (120) inserted into the saving unit mounting unit (110) and coupled in an attachable/detachable manner; and
        a saving unit (130) comprising a saving unit connector (132) coupled to the saving unit tray (120) while being accommodated therein and connected to the main substrate connector (40) when the saving unit tray (120) is inserted and mounted to the saving unit mounting unit (110);
    a card reader bidirectional mounting structure (200) comprising:
        a mounting bracket (210) installed on at least one of a left side and a right side of a POS device main body (10);
        a card reader front cover (220) comprising a front cover slot (221), through which a card passes, formed at a front surface thereof and coupled to the mounting bracket (210) in an attachable/detachable manner;
        a card reader rear cover (240) coupled to the card reader front cover (220) in a detachable manner; and
        a card reading assembly (230) installed in the card reader front cover (220) and the card reader rear cover (240) to read information recorded in the card;
    an input/output port mounting unit integrated type display frame (300) of the POS device, which comprises: a display panel mounting unit (310), in which a display panel (50) is loaded, formed at a front surface thereof; an input/output port mounting unit (320) formed at a rear surface thereof and having an input/output port mounting hole (322), to which an input/output port (31) provided at a main substrate (30) is inserted and coupled, the input/output port mounting unit having a part cut from an input/output port mounting unit perforation (321) and being formed to be bent towards a rear direction so as to be protruded therefrom; and a lower main ventilation hole (330) formed at a lower side of the rear surface thereof; and
    a hinge coupling structure (400) of the POS device, which comprises:
        a hinge bracket (410) mounted inside the rear surface case (10) and comprising a hinge shaft installation part (412) formed with a hinge shaft coupling hole (413) and bent backward from each of both side surface thereof;
        a hinge shaft (420) comprising: a flat part (421) inserted and coupled to the hinge shaft coupling hole (413) in a direction from the inside to the outside and formed with a stand coupling screw hole (422) having a diameter greater than that of the hinge shaft coupling hole (413) and coupled to a stand (S) while both side surfaces thereof are processed to be flat; and a flat screw part (423) passing through the hinge shaft coupling hole (413) to protrude to the outside and formed with a screw thread while both side surfaces thereof are processed to be flat;

a disk spring (442) inserted and installed to the flat screw part (423) with the hinge shaft installation part (412) therebetween; and a coupling nut (440) coupled to the flat screw part (413).

2. The POS device (1) of claim 1, wherein the saving unit mounting unit (110) further comprises:

a mounting guide wall (111) configured to support and guide the saving unit tray (120) while contacting both side surfaces thereof; and a stopper coupling groove (112) formed at an upper side of each of both side surfaces of the mounting guide wall (111), the saving unit tray (120) further comprises a mounting curved elastic part (126) disposed on an upper side of each of both side surfaces of the saving unit tray (120) and formed with a mounting stopper (127) inserted into the stopper coupling groove (112) in an elastic manner when the saving unit tray (120) is inserted and mounted to the saving unit mounting unit (110), wherein the saving unit tray (120) further comprises:

a saving unit coupling part (121) formed to be accommodated in the saving unit (130); and a saving unit connector opening (125) formed at a bottom surface so as to expose the saving unit connector (132) of the saving unit (130); and the saving unit (130) further comprises a coupling groove (131) formed at one portion or more of both side surfaces of the saving unit (130), wherein the saving unit tray (120) further comprises an elastic coupling mounting part (122) configured to provide elasticity to a saving unit coupling projection (124) inserted into the coupling groove (131) by a cut groove (123).

3. The POS device (1) of claim 1, further comprising:

a front cover attachment/detachment fixing part (211) formed at two portions or more of a front surface of the mounting bracket (210) and comprising a side wall part (212) and a stopper (213) to form a "L" shape;

a fixing part through-hole (222) formed at the card reader front cover (220) so that the front cover attachment/detachment fixing part (211) passes therethrough;

a coupling side wall part (223) formed consecutively to the fixing part through-hole (222) and inserted and coupled to the side wall part (212) and the stopper (213);

a rear cover coupling projection (226) formed at each of an upper side and a lower side of an inward side of the inside of the card reader front cover (220);

a coupling groove (227) formed at each of two portions or more of an outward direction of the inside of the card reader front cover (220);

a first coupling projection (242) formed at each of an upper side and a lower side of an inward direction of the inside of the card reader rear cover (240) so as to be coupled to the rear cover coupling projection (226) in an attachable/detachable manner; and a second coupling projection (243) formed at each of an upper side and a lower side of an outer direction of the inside of the card reader rear cover so as to be inserted and coupled to the coupling groove (227) in an attachable/detachable manner.

4. The POS device (1) of claim 1, wherein the input/output port mounting unit integrated type display frame (300) further comprises:

a main substrate mounting unit (360), which further comprises a recessed kernel (350) recessed inward between the input/output port mounting unit perforation (321) and the lower main ventilation hole (330) and to which the main substrate (30) is mounted and fixed;

an upper first ventilation hole (340) formed at an upper side of the input/output port mounting unit perforation (321);

a plurality of upper second ventilation holes (341) formed at the upper side of the input/output port mounting unit perforation (321); and a plurality of lower auxiliary ventilation holes (331) formed at a lower side of the lower main ventilation hole (330), wherein the hinge coupling structure (400) further comprises:

a hinge bracket coupling through-hole (411) formed at the hinge bracket (410) so that a coupling unit is coupled to the hinge bracket mounting through-hole (12) formed at the rear surface case (10) while passing therethrough;

a protruding stopper (414) formed to protrude inward the hinge shaft installation part (412); and a hinge stopper (430) formed with a flat screw coupling hole (431) coupled to the flat screw part (423) and comprising a stopper arm (432) formed to restrict rotation of the hinge shaft (420) while contacting the protruding stopper (414).

5. The POS device (1) of claim 1, wherein the saving unit mounting unit (110) further comprises:

a mounting guide wall (111) configured to support and guide the saving unit tray (120) while contacting both side surfaces thereof; and a stopper coupling groove (112) formed at an upper side of each of both side surfaces of the mounting guide wall (111), the saving unit tray (120) further comprises:

a mounting curved elastic part (126) installed at an upper side of each of both side surfaces of the saving unit tray (120) and comprising a mounting stopper (127) inserted into the stopper coupling groove (112) in an elastic manner when the saving unit tray (120) is inserted and mounted to the saving unit mounting unit (110), wherein the saving unit tray (120) further comprises:

a saving unit coupling part (121) formed to be accommodated in the saving unit (130); and a saving unit connector opening (125) formed at a bottom surface thereof so as to expose the saving unit connector (132) of the saving unit (130), the saving unit (130) further comprises a coupling groove (131) formed at one portion or more of both side surfaces of the saving unit (130), the saving unit tray (120) further comprises an elastic coupling mounting part (122) configured to provide elasticity to a saving unit coupling projection (124) inserted into the coupling groove (131) by a cut groove (123), wherein the card reader bidirectional mounting structure (200) further comprises:

a front cover attachment/detachment fixing part (211) formed at two portions of more of a front surface of the mounting bracket (210) and comprising a side wall part (212) and a stopper (213) to from a "L" shape;

a fixing part through-hole (222) formed at the card reader front cover (220) so that the front cover attachment/detachment fixing part (211) passes therethrough;

a coupling side wall part (223) formed consecutively to the fixing part through-hole (222) and inserted and coupled to the side wall part (212) and the stopper (213), a rear cover coupling projection (226) formed at each of an upper side and a lower side of an inward side of the inside of the card reader front cover (220);

a coupling groove (227) formed at each of two portions or more of an outward direction of the inside of the card reader front cover (220);

a first coupling projection (242) formed at each of an upper side and a lower side of an inward direction of the inside of the card reader rear cover (240) so as to be coupled to the rear cover coupling projection (226) in an attachable/detachable manner; and a second coupling projection (243) formed at each of an upper side and a lower side of an outer direction of the inside of the card reader rear cover so as to be inserted and coupled to the coupling groove (227) in an attachable/detachable manner, wherein the input/output port mounting unit integrated type display frame (300) further comprises:

a main substrate mounting unit (360) which further comprises a recessed kernel (350) recessed inward between the input/output port mounting unit perforation (321) and the lower main ventilation hole (330) and to which the main substrate (30) is mounted and fixed;

an upper first ventilation hole (340) formed at an upper side of the input/output port mounting unit perforation (321);

a plurality of upper second ventilation holes (341) formed at the upper side of the input/output port mounting unit perforation (321); and a plurality of lower auxiliary ventilation holes (331) formed at a lower side of the lower main ventilation hole (330), wherein the hinge coupling structure (400) further comprises:

a hinge bracket coupling through-hole (411) formed at the hinge bracket (410) so that a coupling unit is coupled to the hinge bracket mounting through-hole (12) formed at the rear surface case (10) while passing therethrough;

a protruding stopper (414) formed to protrude inward the hinge shaft installation part (412); and a hinge stopper (430) formed with a flat screw coupling hole (431) coupled to the flat screw part (423) and comprising a stopper arm (432) formed to restrict rotation of the hinge shaft (420) while contacting the protruding stopper (414).

* * * * *